(12) United States Patent
Wang et al.

(10) Patent No.: US 6,654,105 B2
(45) Date of Patent: Nov. 25, 2003

(54) CROSS-CORRELATING PMD DETECTOR

(75) Inventors: Feiling Wang, Medford, MA (US); Xiao-Li Li, Lexington, MA (US); Yingyin Zou, Burlington, MA (US); Wei Hu, Plainsboro, NJ (US)

(73) Assignee: Corning Applied Technologies Corporation, Woburn, MA (US)

( * ) Notice: Subject to any disclaimer, the term of this patent is extended or adjusted under 35 U.S.C. 154(b) by 0 days.

(21) Appl. No.: 10/167,121

(22) Filed: Jun. 10, 2002

(65) Prior Publication Data
US 2003/0067667 A1 Apr. 10, 2003

Related U.S. Application Data

(63) Continuation-in-part of application No. 09/695,538, filed on Oct. 24, 2000, now Pat. No. 6,404,538, and a continuation-in-part of application No. 09/519,293, filed on Mar. 6, 2000, now Pat. No. 6,404,537.

(51) Int. Cl.$^7$ ............................................. G01N 21/00
(52) U.S. Cl. ....................................................... 356/73.1
(58) Field of Search ........................ 356/73.1; 359/245, 359/246, 251–256, 322, 323, 259; 385/5, 12–17

(56) References Cited

U.S. PATENT DOCUMENTS

| | | | |
|---|---|---|---|
| 3,697,757 A | 10/1972 | Stone | 250/199 |
| 4,958,918 A | 9/1990 | Walker | 350/378 |
| 5,611,005 A | 3/1997 | Heismann et al. | 385/11 |
| 2001/0028760 A1 | 10/2001 | Yaffe | 385/27 |
| 2001/0050767 A1 | 12/2001 | Babin et al. | 356/73.1 |
| 2002/0021854 A1 | 2/2002 | Bandemer et al. | 385/11 |

FOREIGN PATENT DOCUMENTS

| | | |
|---|---|---|
| WO | WO01/42749 A1 | 6/2001 |
| WO | WO01/61385 A2 | 8/2001 |
| WO | WO01/86840 A2 | 11/2001 |
| WO | WO02/07351 A1 | 1/2002 |
| WO | WO02/32023 A1 | 4/2002 |

OTHER PUBLICATIONS

"Statistical Theory of Polarization Dispersion in Single Mode Fibers" Foschini, et al Journal of Lighwave Technology vol. 9, No. 11, 11/91.
"PMD: Playing Russian roulette with you network" Lightwave Apr. 2002.
"An Adaptive First–Order Polarization–Mode Dispersion Compensation System Aided by Polarization Scrambling: Theory and Demonstration" Pua, et al Journal of Lighwave Technology, vol. 18. No. 6, 6/00.
"Autocorrelation Function of the Polariztion–Mode Dispersion Vector" Karlsson, et al. Optics Letters vol. 24, No. 14, Jul. 15, 1999.
"Automatic PMD Compensation at 40 Gbit/s and 80 Gbit/s Using a 3–Dimensional DOP Evaluation for Feedback" Rosenfeldt, et al. Optical Society of America.

*Primary Examiner*—Tu T. Nguyen
(74) *Attorney, Agent, or Firm*—Juliana Agon

(57) ABSTRACT

A polarization mode dispersion center (306) measures PMD impairment through the cross-correlation of optical pulses. A second variable phase retarder plate (504) is oriented with polarization eigenstates at preferably 45 degree angle with respect to those eigenstates of a first variable phase retarder plate (502) to provide controllable phase retardations that can be varied and measured as an indication of PMD impairment.

18 Claims, 10 Drawing Sheets

381

382

383

384

385

CROSS-CORRELATING PMD DETECTOR

CROSS-REFERENCE TO RELATED APPLICATIONS

This is a continuation-in-part of U.S. parent application Ser. No. 09/519,293 filed on U.S. Parent Application Filing Date Mar. 6, 2000, now U.S. Pat. No. 6,404,537, the content of which is relied upon and incorporated herein by reference in its entirety, and the benefit of priority under 35 U.S.C. §120 is hereby claimed.

This is also a continuation-in-part of U.S. patent application Ser. No. 09/695,538 filed on U.S. Parent Application Filing Date Oct. 24, 2000, now U.S. Pat. No. 6,404,538, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to optical communication systems, and particularly to detecting or monitoring optical impairments, such as polarization mode dispersion (PMD) which includes chromatic, polarization dependent, and other optical losses in such systems.

2. Technical Background

With the ever increasing bit-rates or data rates in fiber-based optical communication systems, signal degradation from distortion and fading due to well-known but unpredictable optical impairments, such as polarization mode dispersion (PMD) has become a pressing concern. PMD originates from the unwanted and residual birefringence in optical fibers. The birefringence causes light pulses to split into polarization modes that propagate with different velocities along a fiber link. With a simplistic view of the differential group delay (DGD), the differential time of flight between two specific polarization components over a length of fiber, causes the broadening of optical pulses, thus signal degradation.

As is known, an optical pulse exiting a fiber can be decomposed into two components in two mutually orthogonal polarization states that can be arbitrarily chosen. In the presence of PMD, it is convenient to decompose the pulse, at an unpredictable state of polarization (SOP) into two specific polarization components, i.e. the principal states of polarization (PSP). Although there is a differential group delay (DGD) between the two components, in the first order of approximation, each constituent pulse (in a PSP) possesses the same shape as the original pulse (input). Systems, including a polarization transformer and a differential group delay device, designed for the first order PMD compensation separates the two PSPs and inserts an opposite relative group delay so that the overall pulse recovers its original shape.

As the PMD of a fiber varies with time in both magnitude and orientation, an ideal method of compensation is real-time or active so that data transmission is uninterrupted while the PMD is continuously monitored and compensated. A crucial technology in realizing active PMD compensation is to monitor and determine the PSPs and the DGD in a fiber link in real time for a feedback system to automatically compensate for the signal distortion caused by the PMD.

Various schemes have been demonstrated for active compensation or mitigation of PMD at the receiving end. In one system, the lightwave pulses are converted to electrical pulses whose spectrum is analyzed. Schemes can be derived to extract certain frequency components as the distortion indicator that drives the adaptive or compensating components. The conventional feedback system samples the optical signal with a tapped feedback control loop that includes a high-speed photodetector. Similar methods of sensing pulse distortion with high-speed receivers are used in other PMD compensators. Common to these techniques, one or more high-speed photodetectors must be used in the tap. In order to obtain a workable signal-to-noise ratio for extracting certain frequency components from the spectrum as the distortion indicator, substantial optical power must be extracted from the fiber and expensive electronics of microwave frequencies must be included. If the signal-to-noise ratio is not high enough, signal ambiguity may cause control difficulties.

Therefore, there is a need to create a simple, easy to implement feedback system in which the adaptive components are driven by an electrical signal extracted from the optical pulses for indicating optical impairments without using high-speed detectors and high-speed electronics, while obtaining a clear and unambiguous control signal to enable a practical algorithm for fast and automatic PMD compensation.

DETAILED DESCRIPTION OF THE PREFERRED EMBODIMENTS

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

Figure 7:
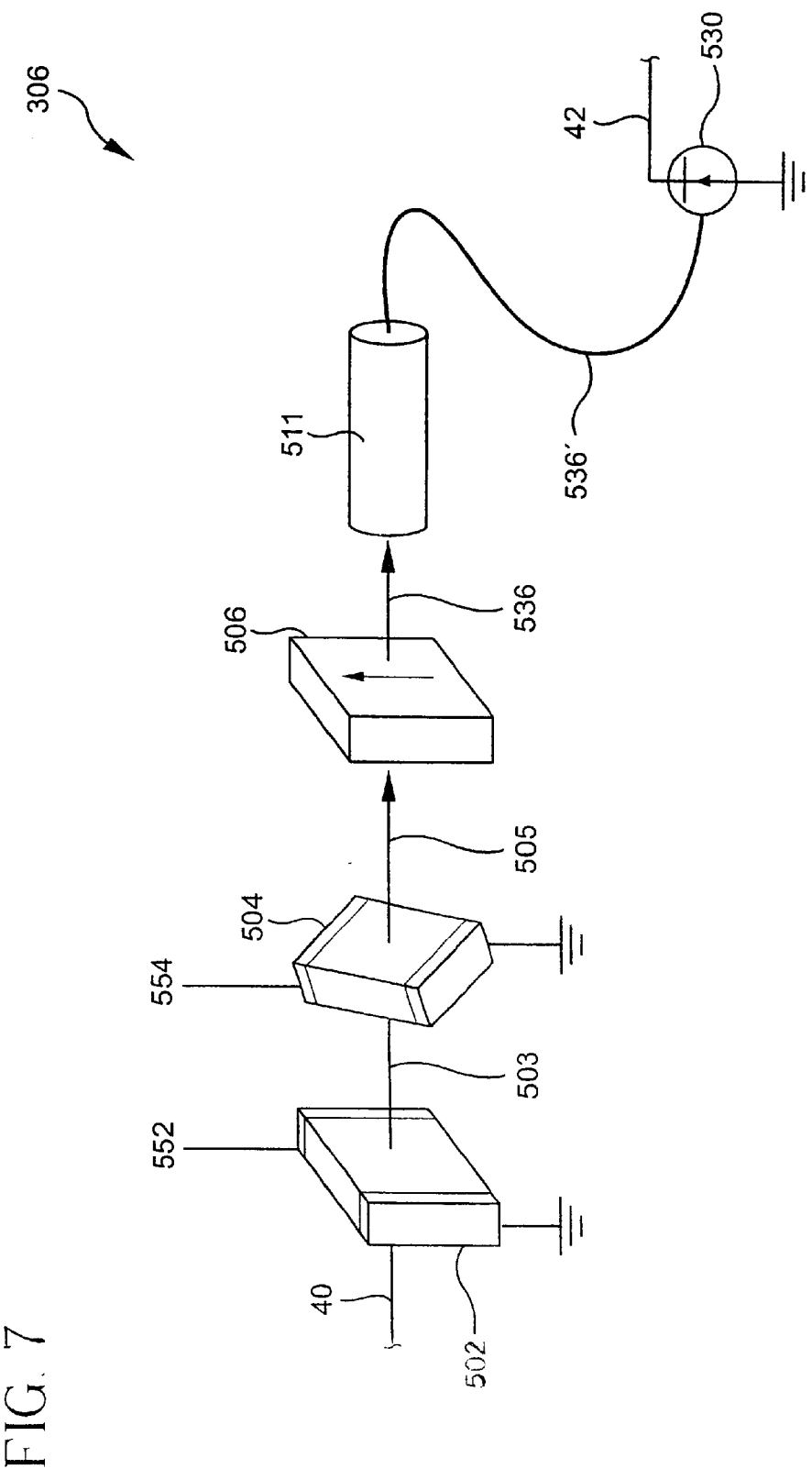
FIG. 7 is a re-representation of FIG. 1, showing two polarization transformers, each having variable phase retardation plates controllable by the controller 540 of FIG. 1, in accordance with the present invention.

Reference will now be made in detail to the present preferred embodiment of the invention, an example of which is illustrated in the accompanying drawings. Wherever possible, the same reference numbers will be used throughout the drawings to refer to the same or like parts. An exemplary embodiment of the optical impairment PMD detector or sensor of the present invention is shown in FIGS. 1 and 7, and is designated generally throughout by reference numeral 306 in the context of an optical communication PMDC system 10.

Figure 1:
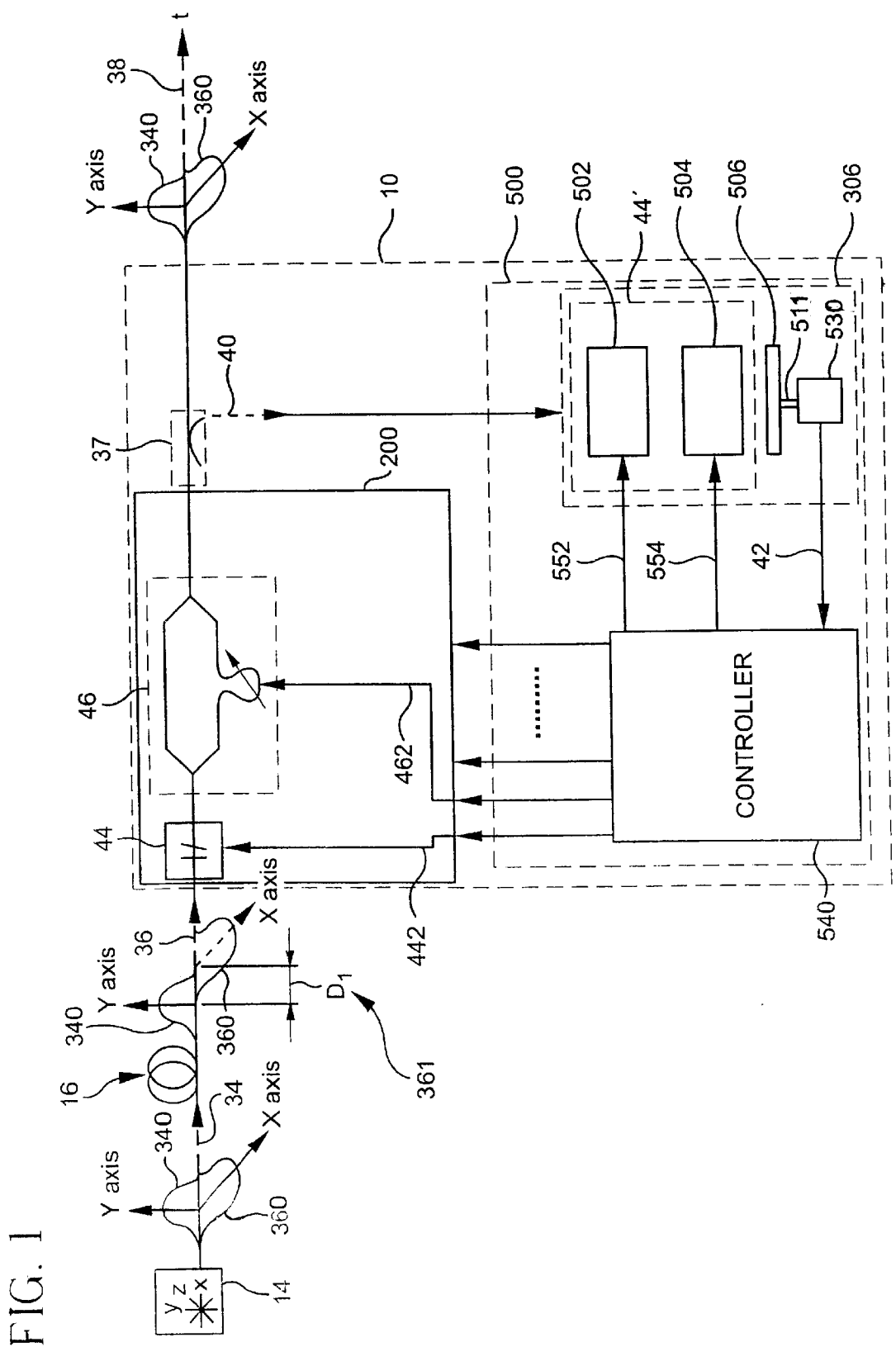
FIG. 1 is a schematic of a polarization compensator for compensation of polarization modulation dispersion (PMD)-induced distortion of an light wave in transmission fibers of an optical transmission system, in accordance with the present invention.

Referring to FIG. 1, an optical arrangement of a PMD compensator 10 including the detector 306 is shown. A polarization mode dispersion detector 306 measures PMD impairment through the cross-correlation of optical pulses of the light wave available from a tapped signal 40 coupled or tapped from a coupler 37. The PMD detector 306 includes a first variable phase retarder plate 502 having a first controllable phase retardation exerted between a pair of orthogonal polarization components of the light wave in a fast axis and a slow axis of the first variable phase retarder plate 502. A second variable phase retarder plate 504 has polarization eigenstates oriented at a preferably 45 degree angle with respect to the polarization eigenstates of the first variable phase retarder plate 502. The second variable phase retarder plate 504 has a second controllable phase retardation exerted between a pair of orthogonal polarization components of the light wave in a fast axis and a slow axis of the second variable phase retarder plate 502. A fixed linear polarizer 506 is optically coupled to the second variable phase retarder plate 504 having its polarization direction parallel to the first variable phase retarder 502. The low-speed photodetector 530 is optically coupled with the polarizer 506 for sensing the intensity of the light transmitted through the polarizer 506. A controller 540 varies the first controllable phase retardation of the first variable phase retarder 502 and varies the second controllable phase retardation of the second variable phase retarder 504 for measuring the intensity oscillation as an indication of PMD impairment or distortion. This indication of PMD impairment is the novel electrical control signal 42 from which the PT compensating signal 442 and the VDGD compensating signal 462 is derived by the controller 540 for controlling the at least one polarization transformer 44 and the plurality of differential group delay elements 46, in response to the measure of PMD impairment such that the endless compensation of the PMD-induced signal distortion results.

In a method for measuring PMD impairment and minimizing the PMD impairment by controlling at least one polarization transformer 44 and the plurality of differential group delay elements 46, the controller 540 varies the second controllable phase retardation in a periodic fashion with a magnitude of at least $2\pi$ while the first controllable phase retardation is adjusted by the controller 540 so that the oscillation of the light intensity sensed by the photodetector 530 reaches a maximum that serves as a measure of the cross-correlation of the light pulses. Alternatively, both the first controllable phase retardation and the second controllable phase retardation are varied independently by the controller 540 such that the light intensity sensed by the low-speed photodetector 530 reaches a minimum as an indication of the cross-correlation of the optical pulses of the light wave for representing the measure of PMD impairment. Hence, two variable phase waveplates 502 and 504, in front of the polarizer 506 are adjusted until the reading on the photodetector 530 is minimized or maximized.

The first and second variable phase retarders each comprises a solid-state ferroelectric variable waveplate having electrode pairs for the application of applied voltages that facilitate the application of variable electric fields perpendicular to the light propagation direction, the electric field in each of the waveplate defining the direction of the slow axis in each of the waveplate and causing the first phase retardation and the second phase retardation that are independently controlled through the applied voltages across the electrode pairs.

In a larger system context, the optical impairment detector and feedback loop of a compensating assembly, such as the active PMD compensator system 10, is used in an optical communcation system 12 which includes an optical transmitter 14 and an optical fiber 16. The adaptive components of an adaptive PMD compensating assembly 200 of the compensator 10 are one or more polarization transformers (PTs) or at least one polarization controller 44 and a variable optical delay line, such as a variable differential-group-delay (VDGD) device or a plurality of differential group delay elements 46. Even though there could be more components, such as one or more polarization transformers and a plurality of differential group delay elements and a plurality of control signals for controlling these adaptive components, only two components are shown inside the assembly 200 within the larger compensator network 10. In the presence of unpredictable PMD from the unwanted and residual birefringence of the optical fiber 16, at least one of the polarization modes 340 of 360 of the optical signals (represented by a dashed line 34) or one of the PSP 360, containing data modulated and originating at the optical transmitter 14 has a temporal delay 361 relative to the other polarization modes or PSP 340. The actual PSPs can be anywhere in a spherical representation. However, only two PSPs are shown aligned on the x and y axes for simplicity. This uncompensated optical signal (represented by a dashed line 36) arrives at the active PMD compensator 10 of a receiver with distortion in the data caused by the PMD in the fiber link 16.

When properly set by a PT compensating signal 442, the function of the polarization transformer (PT) 44 is to convert the two PSPs 340 and 360 to two linear and mutually orthogonal polarization states, in the x-direction and the y-direction, respectively. The first polarization transformer 44, acting as a polarization separator, separates the light wave from the input optical fiber 16 into two polarization components along separate paths within the first polarization transformer 44.

The variable differential-group-delay (VDGD) device 46 is a variable optical delay line that causes the light polarized in the y-direction to experience a group delay relative to the light polarized in the x-direction. By adjusting the optical delay in the VDGD to the correct amount with a VDGD compensating signal 462, the effects of the PMD is neutralized in the optical signal output (represented by the dashed line 38).

In order for the PT 46 to convert the SOP of the PSP 340 and 360 in the desired manner and for the VDGD 46 to insert an appropriate time delay, the compensator 10 samples the optical signal 38 with a tapped feedback control loop that includes a low-speed photodetector 530, in accordance with the teachings of the present invention.

The polarization mode dispersion detector 500 measures PMD impairment through the cross-correlation of optical pulses of the light wave available from a tapped signal 40 coupled or tapped from a coupler 37. The detector 500 includes a first variable phase retarder 502 having a first controllable phase retardation exerted between a pair of orthogonal polarization components of the light wave in a fast axis and a slow axis of the first variable phase retarder 502. A second variable phase retarder 504 is oriented at a preferably 45 degree angle with respect to the first variable phase retarder 502. However, in actual implementation between similar retarders, the angle in-between may vary between 42 and 48 degrees. The second variable phase retarder 504 has a second controllable phase retardation exerted between a pair of orthogonal polarization components of the light wave in a fast axis and a slow axis of the second variable phase retarder 504.

The second phase retardation is varying periodically for causing a periodic phase retardation between polarization components of the light wave 40 with respect to a second fast axis and a second slow axis of the second variable phase retarder 504.

A linear polarizer 506 is optically coupled to the second variable phase retarder 504 having its polarization direction parallel to the first variable phase retarder 502.

The low-speed photodetector 530 is optically coupled with the polarizer 506 for sensing the intensity of the light wave transmitted through the linear polarizer as a measure of PMD impairment through the cross-correlation of optical pulses of the light wave.

A controller 540 varies the first controllable phase retardation of the first variable phase retarder 502 and the second controllable phase retardation of the second variable phase retarder 504 to minimize the measure of PMD impairment and for controlling at least one polarization transformer 44, in response to the measure of PMD impairment.

As one control method, the second controllable phase retardation is varied in a periodic fashion with a magnitude of at least $2\pi$ while the first controllable phase retardation is adjusted by the controller 540 so that the oscillation of the light intensity sensed by the photodetector 530 reaches a maximum that serves as a measure of the cross-correlation of the light pulses. Hence, the intensity oscillation is attempted to be maximized as an indication of PMD impairment or distortion.

In another control method, both the first and second controllable phase retardations are varied independently by the controller 540 such that the light intensity sensed by the low-speed photodetector 530 reaches a minimum as an indication of the cross-correlation of the optical pulses of the light wave for representing the measure of PMD impairment.

This indication of PMD impairment is made possible by the novel electrical control signal 42 from which the PT compensating signal 442 and the VDGD compensating signal 462 is derived by the controller 540.

In accordance with the teachings of the present invention, this novel electrical control signal 42 is thus used by the controller 540 in the optical impairment detector 500 and feedback compensator system 10 to drive the adaptive components 44 and 46. This electrical signal 42 is related to and called the optical data correlation (ODC) function and is extracted from the optical pulses of the light wave 40 with the low-speed photodetector 530 to obtain such a clear and unambiguous control signal 42 to enable a practical algorithm for fast and automatic PMD compensation by the controller 540.

To better understand the function of this electrical signal 42, the theory behind this signal is first given. As is known, lightwave carrying amplitude-modulated signals 34 can be described by an electric field (E) with a time-varying amplitude A(t) at a certain SOP 340 or 360. In the presence of the PMD, optical signals 36 arrive at the PMD compensator 10 with distortion caused by the PMD in the fiber link 16. After traveling down the optical fiber 16 that possesses PMD the signal 36 can be decomposed into two components associated with the two PSPs 340 and 360. As there is a differential group delay, DGD abbreviated as $D_1$ between these two components (represented by a reference 361), the electric field exiting the fiber 16 can be expressed with the following equation:

$$\hat{E}(t) = A(t)P_1\hat{e}_1 + A(t-D_1)P_2\hat{e}_2, \quad (1)$$

where $\hat{e}_1$, and $\hat{e}_2$ are unit vectors specifying the two PSPs; coefficients $P_1$ and $P_2$ are the projection of the input polarization onto the two PSPs 340 and 360.

The polarization transformer (PT) 44 converts the two PSPs 340 and 360 into two linear and mutually orthogonal polarization states, in the x-direction and the y-direction, respectively. The output signal and effect of the PT 46 can then be described by a 2×2 unitary Jones matrix:

$$\begin{bmatrix} E_x \\ E_y \end{bmatrix} = \begin{bmatrix} b_{11} & b_{12} \\ b_{21} & b_{22} \end{bmatrix} \begin{bmatrix} P_1 \\ P_2 \end{bmatrix}. \quad (2)$$

The input field is expressed, on the right-hand side, with the basis formed by the two PSPs while the output field is expressed, on the left-hand side, with the basis formed by the two linear SOPs directed to the x- and y-direction of the output electric field, respectively.

The variable differential-group-delay (VDGD) device 46 causes the light polarized in the y-direction to experience a group delay relative to the light polarized in the x-direction. By adjusting the optical delay in the VDGD to the correct feedback amount the effects of the PMD is neutralized. As the VDGD device 46 introduces a compensating group delay $D_2$ to the component polarized in the y-direction, the final fields (output from the VDGD) of the output signal 38 can be derived as follows:

$$\begin{cases} E_x(t) = b_{11}A(t)P_1 + b_{12}A(t-D_1)P_2 \\ E_y(t) = [b_{21}A(t-D_2)P_1 + b_{22}A(t-D_1-D_2)P_2]e^{j\phi_2} \end{cases}, \quad (3)$$

where $\phi_2$ is the optical phase delay for the y-polarized wave, relative to the x-polarized wave. The above fields produce the output light signal 38:

$$I(t) = |E_x(t)|^2 + |E_y(t)|^2. \quad (4)$$

By utilizing the properties of unitary matrices, the following expression for the output light signal 38 can be derived:

$$I(t) = |b_{11}|^2|P_1|^2 A(t)^2 + |b_{12}|^2|P_2|^2$$

$$A(t-D_1)^2$$

$$+ b_{21}|^2|P_1|^2 A(t-D_2)^2 + |b_{22}|^2|P_2|^2 A$$

$$(t-D_1-D_2)^2 + 2|b_{11}b_{12}*||P_1P_2*|\cos(\beta_5+\gamma)[A$$

$$(t)A(t-D_1) - A$$

$$(t-D_2)A(t-D_1-D_2)] \quad (5)$$

where the phase angles are defined as follows:

$$\begin{cases} b_{11}b_{12}^* = |b_{11}b_{12}^*|e^{j\beta_5} \\ P_1P_2^* = |P_1P_2^*|e^{j\gamma} \end{cases} \quad (6)$$

From Eq. (5), if the PT 44 is adjusted so that $b_{11}=b_{22}=1$ and $b_{12}=b_{21}=0$ the output signal 38 becomes free of the first-order distortion when $D_2=-D_1$, such that $$I(t)=|P_2|^2 A(t)^2.$$

Another desirable PT arrangement by application of the PT compensating signal 442 to the PT 44 is such that $b_{11}=b_{22}=0$ and $b_{12}=b_{12}=1$, under which the output signal 38 is also free of the first-order distortion if $D_2=D_1$ when the VDGD 46 of the compensator 10 cancels the DGD 361 between the two PSPs 340 and 360, such that $$I(t)=|P_2|^2 A(t-D)^2 + |P_1|^2 A(t-D)^2.$$

In order for the PMD compensator 10 to automatically reach one of these two PMD-compensating conditions where the relative delay between the two PSPs are the same, the tapped signal 40 is processed in an auto-correlated manner by an ODC PMD detector 500, as taught by the present invention.

In the tapped feedback loop of the detector 500, the optical signal 505 is transmitted through the polarizer 506 of the ODC PMD detector 500 before reaching the photodetector 530. The light signal or light wave 536 impinging on the input of the low-speed detector 530 is given by:

$$I_{tap}(t) = \frac{1}{2}|E_x(t) + E_y(t)|^2. \quad (7)$$

Since the response time of the photodetector 530 is purposely chosen to be much longer than the bit period of the data rate of the transmitter 14, the photo-current (S) 42 from the output of the photodetector 530 is proportional to the datum-average of the light intensity at the input of the photodetector 530, that is:

$$S = \frac{1}{2}\langle |E_x(t) + E_y(t)|^2 \rangle, \quad (8)$$

where angle brackets denote the datum-average value of the quantity enclosed. Substituting the fields in Eq. (8) with Eq. (3), the photocurrent 42 is found to vary as a function of the setting of the PT 44 and the VDGD 46. In this substitution, an important function, namely, the optical data correlation function, or ODC function is also derived, assuming optical energy is evenly distributed between the two PSPs 340 and 360, the light wave 40 emerges from the PT 44 and VDGD 46 with equal field strength in the x and y direction such that $P_1=P_2$ and $E_x=E_y$ where $E_x$ and $E_y$ are the magnitudes of the x and y component electric field complex amplitudes, respectively, and D is the relative phase between the two $E_x$ and $E_y$ electric field or polarization components. The ODC function with group delay D as its variable is defined as follows:

$$F(D) \equiv \langle A(t)A(t-D) \rangle = \frac{1}{T}\int_{t_0}^{t_0+T} A(t)A(t-D)dt. \quad (9)$$

The above-defined ODC function possesses some important properties.

Firstly, as the integration time T is set much longer than the bit period, the ODC value does not vary with the data, instead, it is a function of the group delay between two amplitude-modulated fields which are identical, in shape, without group delay. In other words, the ODC function is the datum-average optical power related to the interference of the two optical output $E_x$ and $E_y$ fields between which there exists a group delay.

Secondly, because of the randomness of the binary data contained in the light wave 40, the value of the ODC function is invariant when the integration is translated in time, i.e.:

$$\langle A(t+t_o)A(t+t_o-D) \rangle = \langle A(t)A(t-D) \rangle = F(D). \quad (10)$$

In other words, the ODC 42 is an unambiguous indicator of the PMD-induced signal distortion. The use of ODC as feedback enables a simple and reliable algorithm for an automatic and fast compensation of the PMD-induced signal distortion. As the ODC is a datum-average function, little optical power is needed in order to obtain a reliable control signal with a low signal-to-noise ratio requirement. This low signal-to-noise requirement is in contrast to conventional techniques where the distortion indicator is directly extracted from the data bits. Therefore the ODC feedback system should outperform in quality when compared to bit feedback systems in suppressing the power penalty due to the PMD.

Another advantage of the present invention is that the ODC feedback system is bit-rate independent. In other words, an ODC PMD compensator for a 10 Gbit/s system should function equally well for a 40 Gbit/s system.

Figure 2:
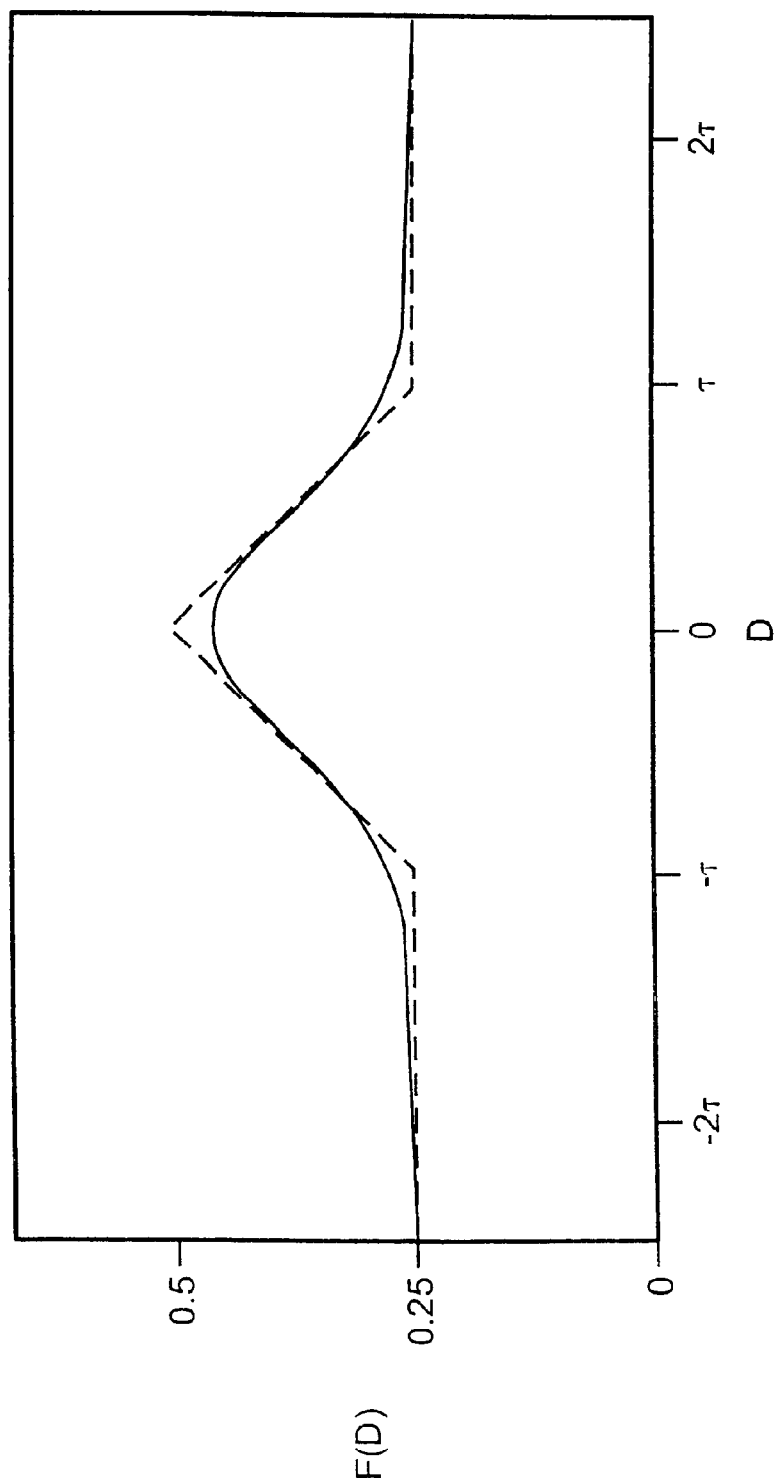
FIG. 2 is a graph of the optical data correlation (ODC) signal 42 of FIG. 1, in accordance with the present invention.

The explicit functional form of the ODC depends on the shape of the pulses associated with the binary data sequence. If square pulses are the shape of the input data optical signal (that implies an unrealistic case of infinite bandwidth), the ODC takes the form represented by the dashed curve in FIG. 2. For realistic binary data that possess non-square pulses, the functional form of the ODC should resemble the solid curve in FIG. 2.

Now substituting the fields in Eq. (8) with Eq. (3) and utilizing the property shown in Eq. (10), the photo-current 42 of the detector 530 is found to take the following form (a proportionality constant is omitted for simplicity):

$$S = \frac{1}{2}F(0) + |b_{11}b_{21}^*|(|P_1|^2 - |P_2|^2)\cos(\beta_3 - \phi_2)F(D_2) + \\ |b_{11}b_{22}^*||P_1P_2^*|\cos(\beta_1 + \gamma - \phi_2)F(D_1 + D_2) + \\ |b_{21}b_{12}^*||P_1P_2^*|\cos(\beta_2 + \gamma + \phi_2)F(D_1 - D_2), \quad (11)$$

where the phase angles are defined as follows:

$$\begin{cases} b_{11}b_{22}^* = |b_{11}b_{22}^*|e^{j\beta_1} \\ b_{21}b_{12}^* = |b_{21}b_{12}^*|e^{j\beta_2} \text{ . (check B1 or B1-3)} \\ b_{11}b_{21}^* = |b_{11}b_{21}^*|e^{j\beta_3} \end{cases} \quad (12)$$

One possible technique of extracting the ODC function is to apply a low-frequency modulation to the optical phase $\phi_2$ where $\phi_2$ is the optical phase delay for the y-polarized wave, relative to the x-polarized wave. This low-frequency modulation is accomplished by using the periodically amplitude varying variable phase retarder 504, serving as a phase modulator, placed in the tapped path 40 of FIG. 1 to provide the phase modulation based on the varying amplitude. If the frequency of the phase modulation is within the bandwidth of the detector 530 there will be an amplitude oscillation in the photocurrent 42 that is abbreviated AOP. The phase modulation depth of the phase modulator or the second variable retarder 504 shall be set equal to or greater than $2\pi$. If the coupling coefficients $P_1$ and $P_2$ that are the projections of the input polarization onto the two PSPs 340 and 360 are kept constant, the AOP is determined by the setting of the PT 44, of the VDGD 46 and the phase $\gamma$.

From minimizing the relative delay of Eq. (5), as derived already, the first compensating condition is given by:

$$\begin{cases} b_{11} = b_{22} = 1 \\ b_{12} = b_{21} = 0 \\ D_2 = -D_1 \end{cases} \quad (13)$$

Under this condition the photocurrent 42 from the detector 530 becomes:

$$S = \frac{1}{2}F(0) + |P_1 P_2^*|\cos(\beta_1 + \gamma - \phi_2)F(0) \quad (14)$$

that produces an AOP:

$$\text{AOP under compensating condition} = |P_1 P_2^*|F(0). \quad (15)$$

Using the properties of unitary matrices, the value represented by Eq. (15) is the greatest that Eq. (11) from the photo-current 42 can produce. In other words, any deviation from the compensating condition, Eq. (13), will result in a reduction in AOP. The only exception is the other compensating condition, which causes the AOP to be essentially equivalent to the one specified by Eq. (13).

The method thus described is the basis for the polarization mode dispersion compensation system shown in FIG. 1. In the system, the AOP is continuously monitored and used as feedback by the controller 540 to drive the two adaptive devices, i.e., PT 44 and VDGD 46. The digital controller 540 tracks the global maximum of AOP by adjusting PT 44 and VDGD 46 in real time. According to the teachings of the present invention, if the controller 540 tracks the maximum AOP, the compensating condition Eq. (13) (or its equivalence) is automatically maintained. The present invention thus tracks the best PMD compensation condition by maximizing the optical data correlation (ODC) function.

The autocorrelation function is similar to the use of the degree of polarization (DOP) for the state of polarization (SOP) in a polarimeter. However, it is implemented, in accordance with the present invention, with fewer components. By using a low speed photodetector 530, the data of the tapped data signal 40 is not recognized to force an automatic averaging over the data period. The measured maximum and minimum of the photo-current corresponds to the modulation applied if the second controllable phase retardation is varied in a periodic fashion with a magnitude of at least $2\pi$ while the first controllable phase retardation is adjusted by the controller 540 so that the oscillation of the light intensity sensed by the photodetector 530 reaches a maximum that serves as a measure of the cross-correlation of the light pulses. Since the modulation signal is not fully sinusoidal, the photo-detection can not respond to the harmonics. Therefore, it is preferable to catch the maximum and minimum values from a ground reference. The quality of the signal, DOP, or figure of merit is a reference to the real maximum and minimum of the intensity of the photodetector current 42. The auto-correlation function is a measure of how related two signals are of a data stream that are transmitted from the same source as one signal and received as a second signal. Hence, the autocorrelation function is a measure of the similarity between time-delayed and un-delayed versions of the same signal, expressed as a function of delay. Autocorrelation itself is defined as the correlation of a waveform with itself. It gives the Fourier transform of the power spectrum of the waveform (the power-density spectrum in the case of random signals). Autocorrelation is also a mathematical technique to measure the degree of rhythmic activity in physical phenomena that vary in a complex manner as a function of time. PMD in the transmission fiber messes up the transmitted and received signals, allowing the components of these two signals to interfere with or be overlapped with each other.

Oscillation is a result of the phase retardation. A large oscillation is related to the modulation depth which is the difference between the maximum oscillation (maximum constructive interference over space and time) measured compared to the minimum oscillation (minimum interference over space and time) measured.

EXAMPLES

The invention will be further clarified by the following examples which are intended to be exemplary of the invention.

Example 1

In one example to test-out the PMD detector 500 according to the teachings of the present invention, a pseudo-random binary sequence (PRBS) of data carried by an optical signal at 2.49 Gbit/s was used as the input optical signal 34. To simulate the unpredictable PMD on the optical line introduced by the fiber 16, a PMD emulator was constructed to generate signal distortion similar in nature to what exists in real fiber links. The optical data streams with the simulated PMD 36 were sent to the PMD detector in the compensator 10 as shown in FIG. 1.

As the adaptive components of the compensator 10, the PT 44 used was the Acrobat™ polarization control module commercially available from Corning Incorporated. In addition, the VDGD device 46 was constructed using two polarizing beam splitters connected with a fixed polarization maintaining fiber (PM fiber) and a motorized variable optical delay line.

In order for the PT 44 to convert the SOP in the desired manner and for the VDGD 46 to insert an appropriate time delay, the inventive system 10 samples the optical signal 38 with a tap 40. In one embodiment, the tap includes a polarization maintaining optical (PM) tap or PM beamsplitter used as the coupler 37. Because the PM coupler is used, the first variable retarder 502 is not needed to be used with the second variable retarder 504 serving as the low-frequency phase modulator and the linear polarizer 506 and the low-speed photodetector 530. In this first example, the prescribed method of extracting the ODC utilizes the low-speed photodetector 530 and an ODC PMD detector which is formed by the low-frequency phase modulator, comprising one or two variable retarders 502 and/or 504 and the linear polarizer 506. The use of only a low-speed photodetector 530 and the resultant low-speed electronics needed provides the extra benefit that this ODC system is low cost.

The polarization maintaining beamsplitter or a non-polarization maintaining coupler serving as the coupler 37, with an additional variable retarder 502 added, maintains the state of polarization (SOP) even after splitting, redirecting, tapping, or sampling a portion of the output light 38, such as with a preferred coupling percentage of 5% of the optical data signal 38. The polarization-maintaining beam splitter (serving as the optical tap 37), for example, directs the tapped light 40 to the low-frequency phase modulator (served by one or both variable retarders 502 and/or 504) that was followed by the linear polarizer 506 and the photodetector 530. A cyclic voltage at a low frequency around 2 kHz was applied to the phase modulator that provided a phase modulation depth greater than 2π.

The polarizer 506 is oriented in a direction that makes 45 degrees with the optical axis of the VDGD device 46 and the PM tap (or non-PM coupler 37 and first variable retarder 502 combination) to maximize the interference between orthogonal input polarization states (PSPs) of the input beam 505 to result in the output beam 536 having a linear polarization to obtain the cross-correlation of optical pulses of the light wave. The linear polarizer 506 can be any known linear polarizer but preferably is a Polarcor® polarizer made by Corning Incorporated for polarizing the light entering the polarizer along a selected axis 516. The polarizer 506, when aligned in the path of an optical signal 505, produces an output signal 536 with a constant polarization by selecting a predetermined polarization component of the signal; however, the intensity of the polarizer output signal 536 varies with the interference of the SOP of the input signal (the two orthogonal PSPs) and hence the SOP of the output signal 506 is not controlled. In other words, the linear polarizer 506 transmits a portion of the entering optical signal 505 having a linear polarization perpendicular to its surface, the signal 536 polarized in one state along the transmission axis 516, while blocking transmission of the other state along the blocking axis. The linear polarizer 506 receives the intensity variations due to interferences between the orthogonal PSPs of the optical data signal 38 that was phase-modulated by the phase modulator but cannot split the data and modulation attributes of each of the PSPs.

The response time of the photodetector 530 was chosen to be 20 μs. According to the teachings of the present invention, the speed of the low-speed photodetector 530 is chosen slow enough so that no data can be resolved from the detected signal 42. In other words, the photo-current 42 of the photodetector 530 is proportional to the datum-average optical intensity over the response time of the low-speed photodetector 530. With this arrangement of the detector 500, an optical data correlation (ODC) function can be extracted by the controller 540 and used as the feedback signals 442 and 462 to drive the PT 44 and VDGD 46.

Figure 3:
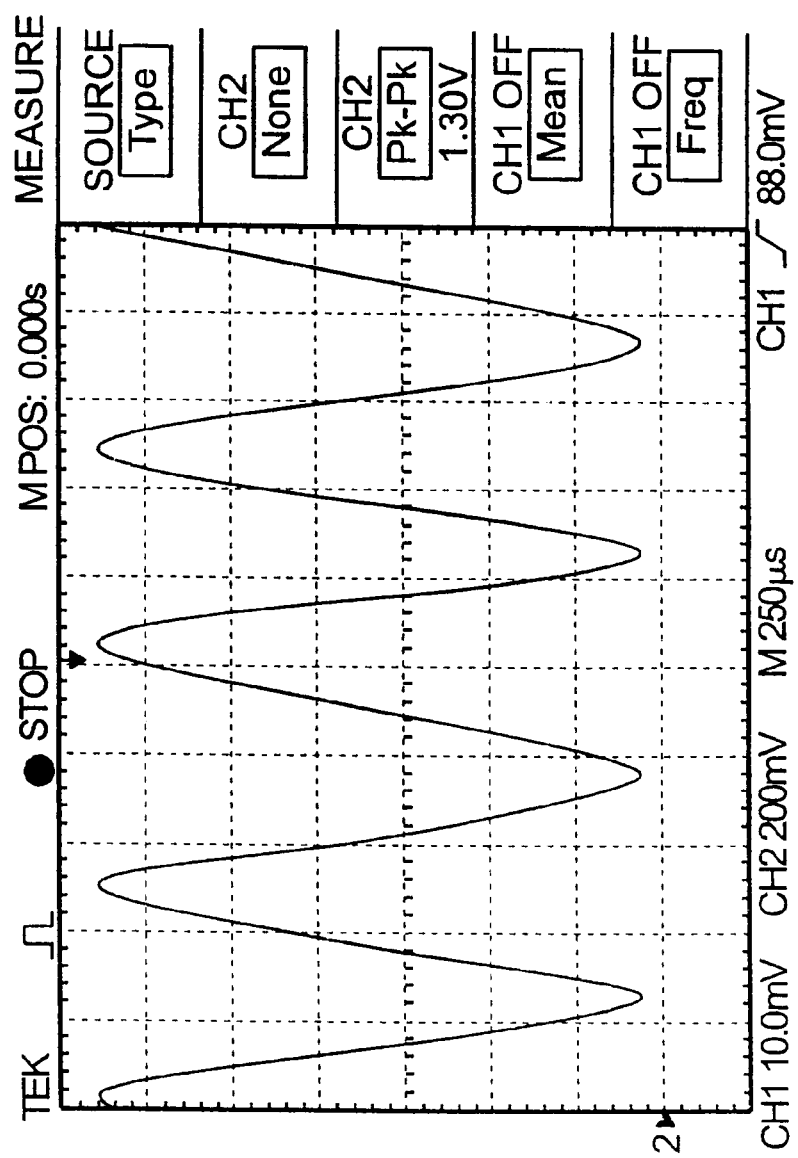
FIG. 3 is an oscilloscope representation of the optical data correlation (ODC) signal 42 of FIG. 1, in accordance with the present invention.

The oscillation of the photo-current 42 from the photodetector 530, in the form of an oscillating voltage through a pre-amplifier that could be part of the controller 540, was recorded by a computer or directly viewed on an oscilloscope screen, as shown in FIG. 3, as a test of the compensator 10 of FIG. 1. The signal quality was viewed and analyzed by a digital communication analyzer available from Agilent. Under each setting of the PT 44 and the optical delay (VDGD) device 46, as determined by the feedback signals 442 and 462, respectively, the eye-diagram, indicating quality of the optical signal was recorded. In order to quantitatively examine the signal quality, a standard mask was used for measuring the number of sampling points that violated the mask. As is known, the number of violations for a given recorded length is proportional to the bit-error rate (BER) of the detection quality of the detector 500.

Figure 4:
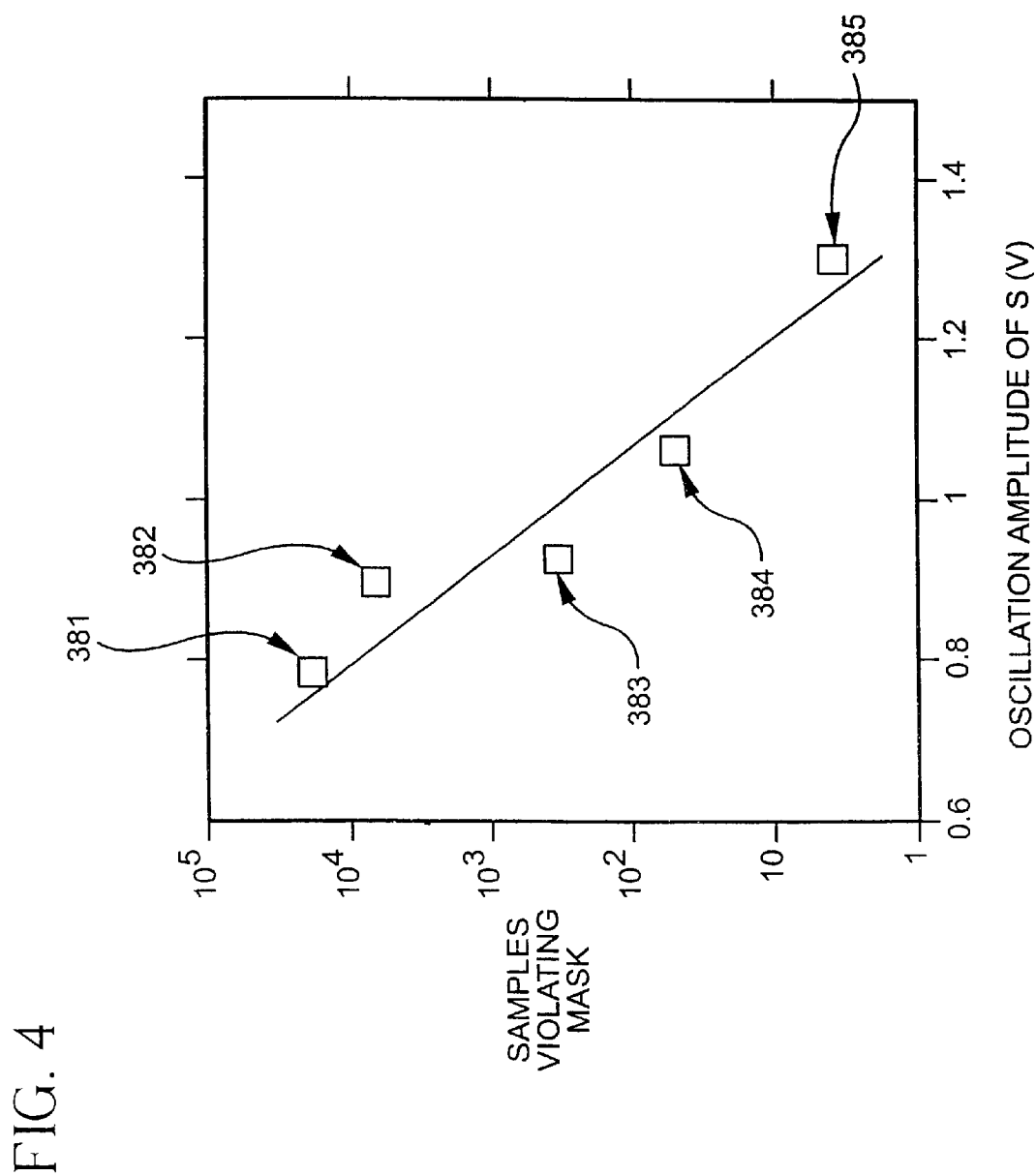
FIG. 4 (including FIGS. 4A–4E) is a chart showing the correlation of eye diagrams, as a figure-of-merit with the oscillationg amplitudes of the optical data correlation (ODC) signal 42 of FIG. 1, in accordance with the present invention.
Figure 4A:
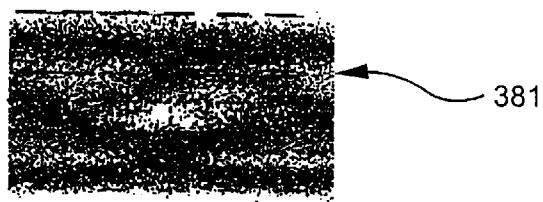
Figure 4B:
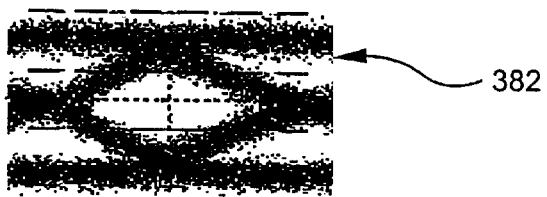
Figure 4C:
Figure 4D:
Figure 4E:
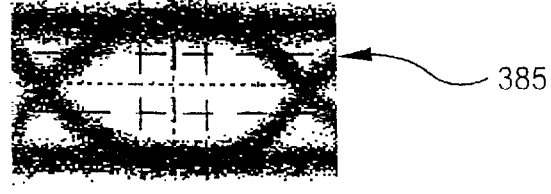

Referring to FIG. 4, the results for five different setting states of the detector system 500 are shown. States #1 through #4 correspond to various degrees of deviation of the PT and VDGD settings, controlled by the feedback signals 442 and 462, from the perfect setting of State #5. The number of samples that violated the mask was recorded for each state as the Y-axis in FIG. 4. The relationship between the number of violations and the amplitude oscillation of the photocurrent (AOP) is shown as a decreasing function in FIG. 4. From FIG. 4, it is seen that large violation numbers are associated with small AOPs. In particular, the lowest violation number corresponds to the largest AOP. It is therefore verified that the system, shown in FIG. 1, can effectively maintain the best PMD compensating point by means of tracking, dithering, scrambling, or otherwise hunting for the largest oscillation of the photocurrent 42 in the tap 40.

Example 2

If a single variable retarder 504 is only used with a PM tap 37 and is considered as the first example of the phase modulator, a second example of the two variable retarders 502 and 504, with a non-PM coupler 37 will now be described with more theoretical explanation. The dual-plate structure of the ODC PMD detector 500 is a lower-cost version of the first example. The two variable waveplates, 502 and 504, are aligned 45 degrees, as in an "endless control" configuration of a simple polarization transformer 44' of FIG. 7, to one another to maximize the potential interference between orthogonal PSPs. If the second variable retarder or waveplate 504 is viewed as a modulator, then the first waveplate 502 can be viewed as a depolarizer for the incoming tapped light 40. Preferably, the first variable phase retarder 502 is a variable waveplate with a retardance of at least 1π. The first variable changing voltage function 552 of the first variable retardation is preferably in the form of a constant $A_1$, where $A_1$ is the normally operating voltage of about 400V for application of voltage onto one of the two waveplates for applying phase retardation but can be varied from 200V to 400V. Similarly, the second variable phase retarder 504 is a variable waveplate with a retardance of at least 2π at a periodic fixed frequency ranging from 1 KHz to 100 KHz. The second variable changing voltage function of the periodic fixed frequency modulating signal 554 is preferably in the form of $A_2\sin(wt)$, where $Ae_2$ is the normally operating voltage of about 400V for application of voltage onto one of the two waveplates for applying phase retardation and wt is a fixed frequency selected from the range between and including 1 KHz to 100 KHz and preferably at 2 KHz. The phase modulator thus formed generate an interference fringe pattern of constructive and destructive intensity interference between the orthogonal PSPs that can be detected by the photodetector 530. Thus, by perpendicularly applying electric fields transverse to the direction of optical beam propagation through the waveplates 502 and 504, the relative phase retardation between the fast and the slow, or the orthogonally polarized PSPs (the $E_x$ and $E_y$ rays in the optical beam), all possible SOPs can be realized as in the "endless control" configuration of a simple two plate polarization transformer. The interference between the orthogonal PSPs produces an intensity transmission function transmitted by the polarizer 506 and detected by the photodetector 530. The linear polarizer 506 is aligned at a 45 degrees angle with the optical axis of the second variable waveplate 504 to maximally cause the interference between the orthogonal PSPs.

Figure 5:
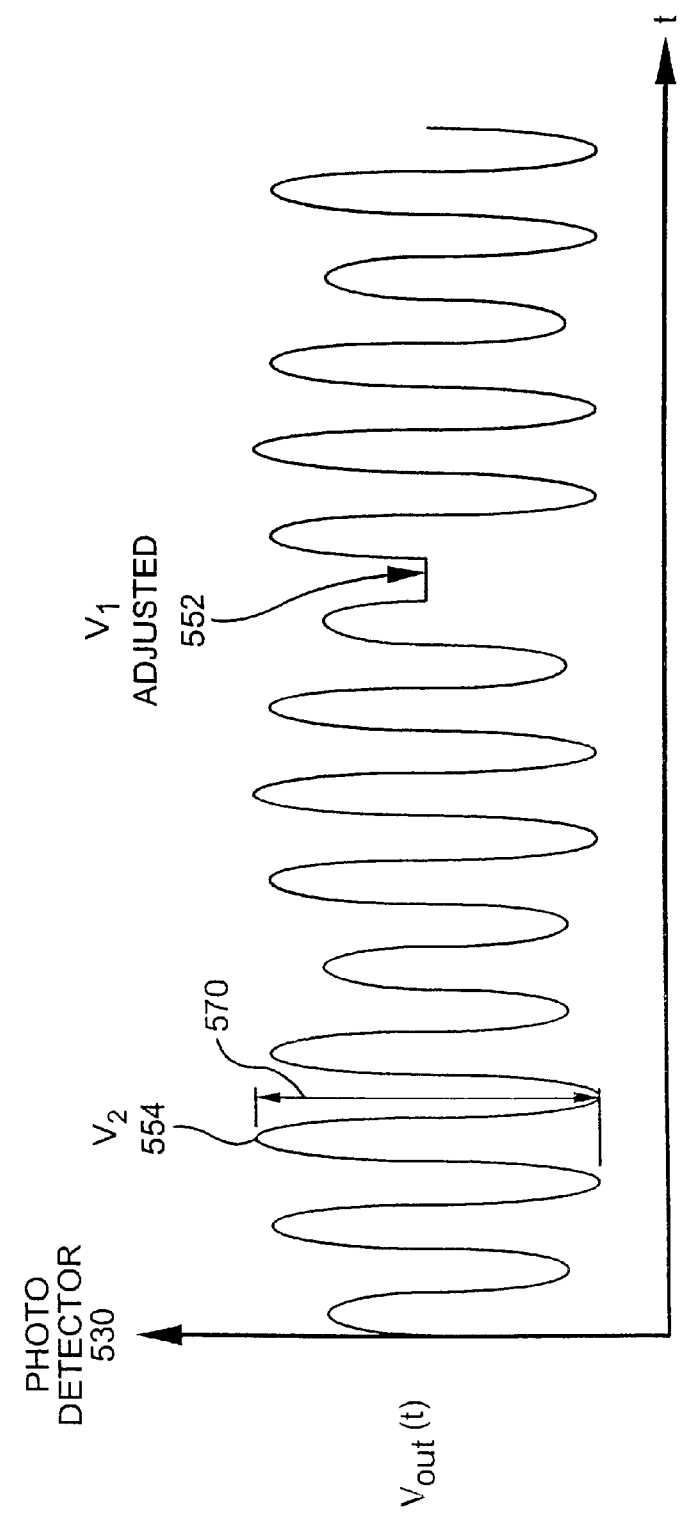
FIG. 5 is a graph of the optical data correlation (ODC) signal 42, in response to the locally oscillated loops 52 and 54 of FIG. 1, in accordance with the present invention.

The low-speed (slow enough not to see the data) photodetector 530 thus collects the light through the polarizer 506. The low speed photodetector 530 produces an electrical signal 42 corresponding to the low frequency modulation having the form V(t) as represented by FIG. 5. The speed of the photodetector 530 is preferably chosen to be about twice as fast as the modulating signal. Thus, the preferred range of the photodetector is about 2 KHz to 200 KHz with a preferred frequency of 20 KHz when used with a modulator having a preferably fixed modulation frequency of 10 KHz. If the modulation waveform is not sinusoidal, higher orders of PMD can also be detected by the photodetector 530. The photodetector 530 thus provides an output current 42 that is proportional to the intensity of the interferered or otherwise combined electromagnetic waves or light waves impinging on the detector 530 adjusted for the inherent or to be corrected phase difference between the orthogonal components $E_x$ and $E_y$. Additional phase difference shifts are added by the first variable retarder 502 by changing the voltage of $A_1$ until the intensity function reaches a global maximum or global minimum. The photocurrent 42 follows the cosine curve of Eq. (14). This relationship follows because the photocurrent 42 depends on the resulting optical intensity of the two components $E_x$ and $E_y$ incident on the photodetector 530 from the orthogonal PSPs which intensity will vary depending on how much constructive or destructive interference occurs between the two components $E_x$ and $E_y$.

To explain the functions of the dual-plates, for simplicity, the second variable plate 504 will be described first. The low-frequency cyclic voltage 554 is applied to the second variable waveplate 504 serving as a low-frequency phase modulator, which imposes a low-frequency cyclic phase retardation to the optical field in the y-direction 564, relative to the field in the x-direction 566. If the light 503 incident on the second retarder 504 consists of both the x- and the y-component, i.e., $E_x$ and $E_y$, the intensity of the light 536 through the polarizer 506 exhibits an oscillation. If the magnitude of the phase retardation from the second retarder 504 is equal or greater than $2\pi$, the peak-to-peak value of the amplitude oscillation of the photocurrent (AOP) at the output of the low-speed photodetector 42 and represented by FIG. 5 is proportional to $E_x E_y$ as encountered in deriving Eq. (9). As the photodetector 530 is too slow to resolve the data, the peak-to-peak oscillation of the current density function of the photocurrent ($J_{pp}$) is proportional to the data-averaged value of $E_x E_y$, that is:

$$AOP \propto J_{pp} = ODC \propto \langle E_x E_y \rangle \quad (16)$$

Since polarization modes of the incoming data signal do not change quickly, the polarization transformer (PT) 44 is held steady while the detector 500 adaptive feedbacks and adapts the proper ODC value for maximally compensating PMD before the polarization mode from the incoming data signal is changed again. When the PT 44 is thus held steady, the optical field $E_x$ is converted from one PSP and $E_y$ from the other PSP, $J_{pp}$ maximizes when there is no DGD between $E_x$ and $E_y$. $J_{pp}$ is, in fact, the optical data correlation (ODC).

The use of the first variable waveplate 502 is to ensure that the maximum $J_{pp}$ corresponds to the fully restored or compensated optical signals regardless of the power split between the two PSPs 340 and 360. To simplify the analysis, assume that the optical axes of the VDGD 46 coincide with that of the second variable waveplate 504, i.e, x (referenced as 566) and y (referenced as 564). To achieve perfect compensation, the first requirement is for the PT 44 to convert the two PSPs 340 and 360s into two linear SOPs which are aligned with the x and y-direction, respectively. Using the notations of the Jones matrix, the output signal and effect of the PT 44 is:

$$\begin{pmatrix} E_x \\ E_y \end{pmatrix} = \begin{pmatrix} 1 & 0 \\ 0 & 1 \end{pmatrix} \begin{pmatrix} P_1 \\ P_2 \end{pmatrix} \quad (17)$$

where $P_1$ and $P_2$ are the projections of the optical fields on the $1^{st}$ and $2^{nd}$ PSP 360 and 340, respectively. It is to be appreciated that in the above equation the basis vectors for the left hand side are the two linear SOPs; and those for the right hand side are the two PSPs 340 and 360. Eq. (17) is the same as Eq. (2) where the first compensating condition applies when $b_{11}=b_{22}=1$ and $b_{12}=b_{21}=0$ such that the output signal from the PT 44 is so adjusted and $D_2=-D_1$ when the VDGD 46 of the compensator 10 cancels the DGD between the two PSPs 340 and 360 such that Eq. (5) becomes $I(t)=|P_1|^2 A(t)^2+|P_2|^2 A(t)^2$ and is free of the first-order PMD distortion.

Figure 6:
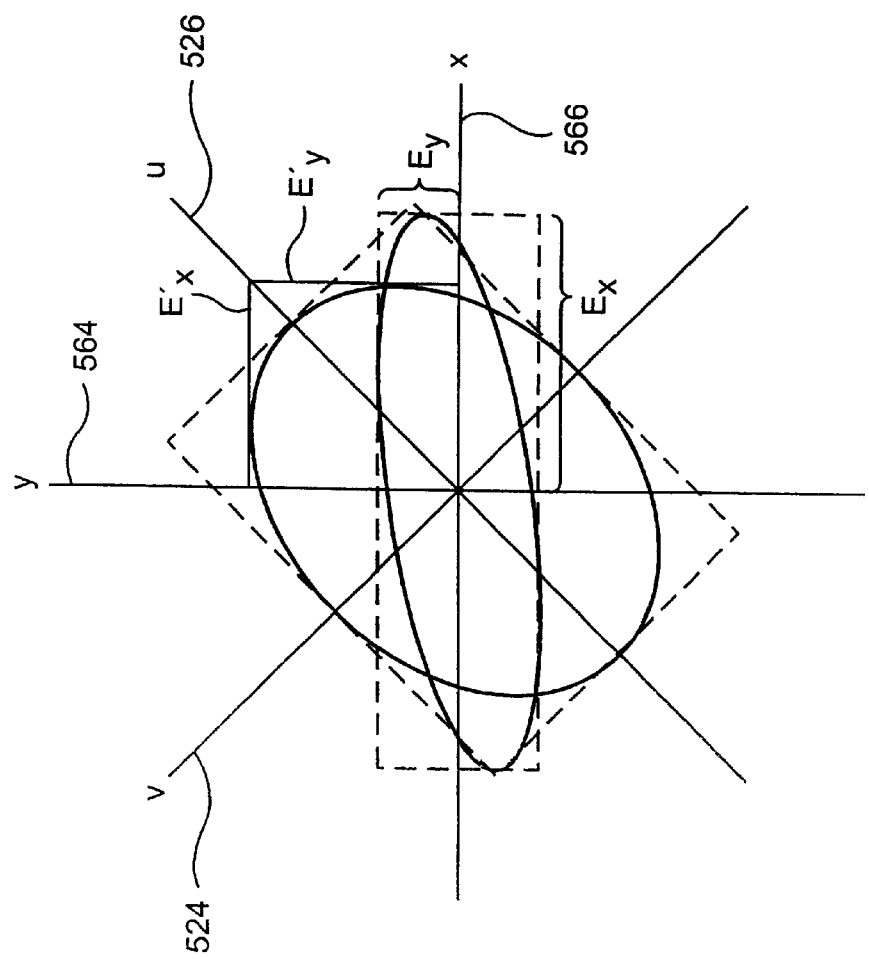
FIG. 6 is a representation of the state of polarization of optical signals being resolved, in accordance with the present invention.

If the optical energy is unevenly distributed between the two PSPs 340 and 360, the light wave emerges from the VDGD 46 with unequal field strength in the x and y direction. FIG. 6 shows one of such cases where $P_1 > P_2$, therefore, $E_x > E_y$.

Here again, the conditions to achieve perfect compensation are firstly that Eq. (16) is maximized; and secondly that the VDGD 46 of the compensator 10 cancels the DGD 361 between the two PSPs 340 and 360. When these two conditions are satisfied, the optical signal 38 emerges from the VDGD 46 free of distortion.

These two ideal conditions, however, do not necessarily correspond to the maximum of $J_{pp}$, unless $P_1=P_2$. This is because when $P_1$ and $P_2$ are unequal, $J_{pp}$ can maximize when there are mixtures of the two PSPs in both $E_x$ and $E_y$ in Eq. (2), that is:

$$\begin{pmatrix} E_x \\ E_y \end{pmatrix} = \begin{pmatrix} a & -b^* \\ b & a^* \end{pmatrix} \begin{pmatrix} P_1 \\ P_2 \end{pmatrix}, \quad (18)$$

where both a and b are non-zero. Under contain phase conditions, the superposition of $P_1$ and $P_2$ can reduce $E_x$ and increase $E_y$, causing the maximum of $J_{pp}$ to deviate from the ideal conditions. In other words, under certain phase conditions, the maximum of $J_{pp}$ can occur with incomplete separation of $P_1$ and $P_2$ in the VDGD 46, resulting in residual PMD-induced signal degradation.

In order to assure that the perfect compensation is achieved in any power split ratio, a second or extra waveplate 502 is used, when the polarization maintaining tap is not used as a PM beamsplitter 37 to save costs. In FIG. 6, assume that the magnitudes of $P_1$ and $P_2$ are unequal. Assume further that Eq. (17) is satisfied ($E_x$ is entirely converted from $P_1$; and $E_y$ is entirely converted from $P_2$). The SOP of the light wave 40 incident on the first variable waveplate 502 can then be represented on a portion of the Poincare' sphere by an ellipse tangent to the rectangle whose sides are equal to $2E_x$ and $2E_y$. Because the axes of the first variable waveplate 502 are rotated by 45 degrees from the second variable waveplate 504, the first variable waveplate 502 can convert the SOP (the ellipse bounded by the unprimed $E_x$ and $E_y$ rectangle) to any ellipse bounded by the primed $E'_x$ and $E'_y$ rectangle. The first and second waveplates 502 and 504 basically form a two-plate polarization transformer 44'. As is known, polarization transformers can convert any input SOP to any output SOP. Therefore, there must be a retardation value for the first variable waveplate or retarder 502 to convert the SOP from the unprimed ellipse to the primed ellipse. It should be noted that the primed rectangle is tangent to both the primed and unprimed ellipsis.

The new electric fields in the x- and the y-direction, $E'_x$ and $E'_y$, are now equal in magnitude because the principal axes, u and v (represented by 526 and 524, respectively), of the primed ellipse make a 45 degree angle with x and y axes (represented by 566 and 564, respectively) of the unprimed ellipse. The optical data correlation (ODC) function $J_{pp}$ (now proportional to $<E'_x E'_y>$) from Eq. (16) now maximizes when there is no mixture of the two PSPs 340 and 360 in one eigenstate of the VDGD 46 and there is no DGD 361 between $E_x$ and $E_y$ to satisfy Eq. (17) and the first compensation condition, provided that the phase retardation of the first variable waveplate 502 is appropriate. In other words, with the addition of the new parameter (the phase retardation of the first variable waveplate 502), the maximum of $J_{pp}$ always corresponds to the two sub-conditions of the first compensating condition for a perfect compensation. These two sub-conditions are that: 1) the two PSPs 340 and 360 are completely separated; and 2) the DGD of the compensator 10 cancels the DGD 361 between the two PSPs 340 and 360.

There are at least two possible ways for a control algorithm to track the perfect compensation sub-conditions. One way is to scan the phase retardation of the first variable waveplate 502 for every adjustment of the adaptive or compensating components (PT 44 and VDGD 46) so that the $J_{pp}$, the ODC or the AOP of Eq. (16) under the appropriate retardation setting 552 of the first variable waveplate 502 is always acquired.

Alternatively, the phase retardation of the first variable waveplate 502 can be treated as an additional control parameter that needs to be updated every once in a while. In the dual-plate detector 500, two voltages 552 and 554 are thus supplied to the detector 500. One voltage is cyclic (at some kHz frequency) on a first line from the controller 540 to the second waveplate 504. The other voltage is either cyclic (at a lower frequency) or periodically updated as just a voltage level that can be changed on a second line from the controller 540 to the first waveplate 502. Hence, two lines link the controller 540 with the dual plates 502 and 504 of the detector 500 to adjust for the proper retardation, phase delay or phase difference between the electric field components until the exact phase retardation between the two field components are perfectly compensated by the variable differential group delay device or apparatus as indicated by a maximum peak-to-peak voltage from the photodetector 530. Referring back to FIG. 5, the maximum peak-to-peak voltage 570 is sought, hunted, dithered, or tracked by adjusting $A_1$ of the first retarder's setting 552 until the maximum voltage is periodically detected by the photodetector 530 as the periodic fixed frequency modulating signal 554 is varying in the form of $A_2\sin(wt)$. The frequency of the retardation adjustment of the first variable waveplate 502 should be determined by several factors, among which is the rate of change in the power split ratio. For example, the frequency of the retardation adjustment of the first variable waveplate 502 should be equal to or greater than the rate of change in the power split ratio.

Referring to FIG. 7, the control circuit or compensator 10 of FIG. 1 for use in controlling polarization mode dispersion is re-shown to illustrate the retardation adjustment or controlled phase change by the two polarization transformers 44 and 44'.

In each of the polarization transformers 44 and 44', the first and second variable phase retarders 502 and 504 each comprises a solid-state ferroelectric variable waveplate having electrode pairs 102 and 104 for the application of applied voltages that facilitate the application of variable electric fields perpendicular to the light propagation direction. The electric field in each of the waveplate defines the direction of the slow axis in each of the waveplate and causes the first phase retardation and the second phase retardation that are independently controlled through the applied voltages across the electrode pairs. Preferably, the first variable phase retarder 502 and the second variable phase retarder 504 each comprises a material in the lead lanthanum zirconate titanate (PLZT) system.

The PLZT materials are ferroelectric. Other usuable class of ferroelectric complex oxides include PZT, PMNT, PMN-PT, PZN-PT, and PMNT. Each of the polarization transformers 44 and 44' are similarly made up of at least two plates 502 and 504 of transparent polycrystalline material having an optical axis 524, 526, 564, 566 oriented perpendicular to a propagation direction of radiation at a wavelength between 1200 nm and 1600 nm incident upon the plate that has a first polarization state. For applying an electric field to provide controlled phase change such that the polarization of radiation transmitted through the plate is transformed from the first polarization state to a second polarization state, each of the plate has electrodes 102 and 104.

The general requirement for the two plates 502 and 504 for use as electro-optic phase retarders is that, when a voltage is applied, a phase shift of $\pi/2$ for the reflection mode and $\pi$ for the transmission mode is produced between differing polarization directions. Preferably, the material has a high electro-optic coefficient in order to reduce operating voltages to less than 500 volts. Also, the material isotropic index of refraction is sufficient to achieve polarization-independent operation. Preferably, the mechanical characteristics allow formation of a bar or plate for use as the electrode. Of course, the material must be transparent at the wavelength of interest, e.g., between 1200 nm and 1600 nm.

A number of electro-optic materials are available, but many require on the order of kilovolts to obtain an appreciable phase change. These requirements are satisfied by a class of ferroelectric complex oxides which 1) are optically isotropic; 2) have a Curie temperature less than about 490° C., so that electro-optic coefficients are high near room temperature; 3) have a diffusive phase transition, so that the temperature dependence of the electro-optic coefficients is lessened; and 4) which are not permanently poled by moderate electric fields since materials with a low Curie temperature that become permanently poled are less stable. Example material systems include lead zirconate titanate (PZT), lanthanum modified PZT (PLZT), lead manganese niobate (PMN), a solid solution of lead zinc niobate and lead tantalate (PZN-PT), and a solid solution of lead manganese niobate and lead tantalate (PMN-PT). Besides PLZT and PZT, without being an exhaustive list the following materials may be used: $Pb(Zr,Ti)O_3$, $Pb(Mg,Nb)O_3$, and a solid solution of $Pb(Mg,Nb)O_3$ and $PbTaO_3$. More members of this class may be discovered in the future. These ferroelectric materials are available from Corning Incorporated and referenced as OptoCeramic™ materials.

PLZT with a nominal 9.5/65/35 La/Pb/Zr composition is a preferred OptoCeramic™ material. This composition is known to be transparent in a range from 450 nm to 7 μm; see, for example, Lionel M. Levinson, Electronic Ceramics, Chapter 7 (Marcel Dekker, New York, 1987). It is commercially available as hot pressed ceramic plates from Aura Ceramics (New Hope, Minn.). In the form of hot-pressed ceramics, it is optically isotropic and exhibits little birefringence with zero applied voltage. The electro-optic coefficient is high and the effect is approximately quadratic with voltage. PLZT does not exhibit large linear effects (d=r=0)

but has high quadratic coefficients, y and R. For reference purposes nominal values for PLZT with a 9/65/35 La/Pb/Zr composition are n=2.45 and R=2.53×10$^{-16}$ m/V$^2$ at 0.88 μm and n=2.3 and R=2.4×10$^{-16}$ m/V$^2$ at 1.55 μm. PLZT has a polycrystalline structure with crystal sizes ranging from about 5 to 20 microns. The required electric fields are considerably higher than for liquid crystal-based devices, but the response time is much shorter.

Another preferred OptoCeramic™ material, PMN-PT, for use in the present invention may be described by the general formula

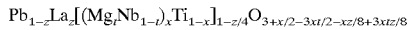

wherein x is between about 0.6 and about 0.95, z is between about 0 and about 0.08, and t is between about 0.30 and about 0.36. In especially preferred electro-optic ceramic materials of the present invention, z is between about 0.01 and about 0.06. In preferred electro-optic materials of the present invention, t may be between about 0.32 and about 0.34, and x may be between about 0.65 and about 0.90.

Yet another preferred OptoCeramic™ material, PZN-PT, for use in the present invention may be described by the general formula

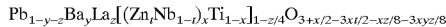

wherein x is between about 0.5 and about 0.9, y is between about 0.05 and about 0.5, z is between about 0 and about 0.05, and t is between about 0.30 and about 0.36. In especially preferred electro-optic ceramic materials of the present invention, x is between about 0.65 and about 0.85, y is between about 0.1 and about 0.2, z is between about 0.02 and 0.04, and t is between about 0.32 and about 0.34.

The explanation of the compensator 10 continues with the first polarization transformer 44, the differential group delay (DGD) 46, the second polarization transformer 44' in the sensor circuit 306 that is disposed in a transmission path from left to right in the figure, and a control logic block or controller 540 in a feedback path from the sensor 306 to the first polarization transformer 44 and group delay 46. The first polarization transformer 44 rotates the SOP of the incoming light signal to match the axes of the DGD 46. The light propagates through the DGD 46 such that the path length for one polarization component is different and adjustable with respect to the other polarization component. When this difference is equal in magnitude and opposite in sign of that in the network, the polarization mode dispersion is fully compensated.

The control approach of the controller 540 applies in a similar manner to a coherent detection system, in which a locally generated laser light beam is added to the signal-carrying beam and detected by a square law detector that generates a beat signal. The strength of the beat signal depends on the polarization state of the two beams. The polarization state can vary between 0 and a maximum value depending on whether the two beams are orthogonally polarized or parallel to each other. In such an application, the monitored parameter can be the signal level at the modulation frequency relative to the optical power. Initially the polarization state is set to maximize this ratio and the control logic tracks changes in the polarization state so that the output polarization is kept constant.

Various methods of resolving polarization can be obtained by modification to the coherent detection, interferometric, polarimetric, or other suitable techniques to provide a high-frequency, high-amplitude modulation within the PMC compensator 10. For example, the controller 540 can vary both locally oscillated loops 52 and 54 at a lower frequency to reduce power consumption of the detector or sensor 500, instead of only driving one of the retarder plates 502 or 504 at a high frequency 544 that could result in a higher power consumption rate. However, simpler approaches such as a voltage setting directed, scrambling, or dithering by the controller 540 as shown in FIG. 7 is also possible. When two very different frequencies 522 and 544 are used to drive the retarder plates 502 and 504, a new instantaneous reading of the photodetector current 42 should not be taken until waiting half a period of the slow frequency before the next instantaneous signal measurement 42. If instead, the retarder plate that was driven at the slow frequency was not varied as a periodic signal but is instead a fixed signal having only the amplitude that can be selected, this selectable amplitude waveplate still offers a degree of freedom of control by the controller 540. The trade-off now is that the speed of the sensor or detector 500 is limited by one period of the fast frequency which again is limited when using a direct drive circuitry for either of the retarder plates 502 or 504. Alternatively, the controls of both waveplates 502 and 504 can be applied to keep track of the minimum current on the photodetector 530 to provide a relative measure of the DOP.

Hence, a polarization compensator 10 for compensation of polarization modulation dispersion (PMD)-induced distortion of an light wave 14 in transmission fibers of an optical transmission system 12 is taught by the present invention, as seen in FIG. 1. The compensator 10 includes the differential group delay device 46 for adjusting PMD values. The first polarization transformer 44 couples the light wave 14 to the differential group delay device 46 to provide endless compensation of the PMD-induced signal distortion 36 such that the polarization transformer 44 has sufficient degrees of freedom, image-forming the two PSPs of the fiber being compensated onto the PSPs of the differential group delay device 46, without settling at a local minimum of the overall PMD. According to the teachings of the present invention, the detector 500 is a polarimeter, for measuring PMD distortion of the data output signal 38, after the data output signal 38 traverses the first polarization transformer 44 and the differential group delay device 46. The input port of the polarimeter 500 is a polarization beam splitter or a coupler 40 having one output connection for dividing-out or otherwise tapping-off the data output signal 38 from the first polarization transformer 44 and the differential group delay device 46 as a tapped output signal 40. The polarizer 506 polarizes the tapped output signal 40 as an indication of PMD by detecting the polarization of all spectral components contained in the tapped output signal as representing the PMD distortion emerging from the the first polarization transformer 44 and the differential group delay device 46. The second polarization transfomer 44', formed by the two birefringent waveplates 502 and 504, cross-correlates, matches, resolves, or otherwise adapts the starting polarization of the differential group delay device 46 to the polarization of the polarizer 506. Each of the two birefringent waveplates 502 and 504 have axes of birefringence subtending an angle between 42 and 48 degrees, and at least one correcting element 552 or 554 is provided to adjust the starting polarization, which acts on at least one of the birefringent waveplates 502 or 504, in response to a modulating frequency provided by the controller 540 for matching the polarization eigenmodes of the fiber into the split polarizations of the differential delay device 46. The photodetector 530, coupled to the polarizer 506, generates an instantaneous signal 42 that is within a bandwidth adapted to the modulation frequency provided by the controller 540.

The controller 540 receives the instantaneous signal 42 from the photodetector 530 and adapts 462 the starting polarization of the differential group delay device 46 in response to the instantaneous signal. Hence, the controller 540 controls the differential group delay device 45 in response to the indication of PMD impairment such that the endless compensation of the PMD-induced signal distortion results. The controller 540 has several control loops 552, 554, 442, and 462 for modulating the second polarization transformer 502 and 504 with different frequencies, such that the controller 540 uses the starting signal of the instantaneous signal 42 to obtain information as to the amplitude and the phase angle of the signal output from the differential group delay device 46 and uses this information to carry out fast and direct control for adjusting the individual control loops so that the polarization is constant for all spectral components contained in the instantaneous signal 42. The instantaneous signal 42, providing a minimal photocurrent of the photodetector 530, is used as the control criterion for adjusting the constant polarization for all spectral components contained in the instantaneous signal 42, wherein the controller 540 evaluates the minimal photocurrent with frequency and phase selectivity. Instead of using analog control, the controller 540 preferably uses a digital signal processor to calculate the suitable settings 544 and 522 for the local oscillating circuits for the correcting elements 552 and 554, at which the frequency and phase-selective signals are applied. Because the photodetector 530 is low-speed, the instantaneous signal 42 provided to the controller 540 is already a filtered signal usable as a regulating signal whose high-frequency spectral components of the data signal are already filtered out, so that the filtered signal 42 reflects the degree of distortion of the detected data signal 38. By using this signal 42, the controller 540 minimizes the PMD-induced signal distortion by alternately fine-tuning 442 or 462 the first polarrization transformer 44 and the differential group delay device 46, such that the instantaneously signal 42 indicating a monotonically changing observable which when maximized or minimized results in an elimination of the delay between finally properly polarization-converted components of the differential group delay device 46. In this manner, the second polarization transformer 502 and 504 conditionally transforms polarization into the instantaneous signal 42 for indicating a figure of merit for the cross-correlation of optical pulses of a light wave as a degree of polarization (DOP) of the state of polarization of the PMD-induced distortion signal, such as the indication of DOP in a more complex polarimeter for emulator usage.

Figure 8:
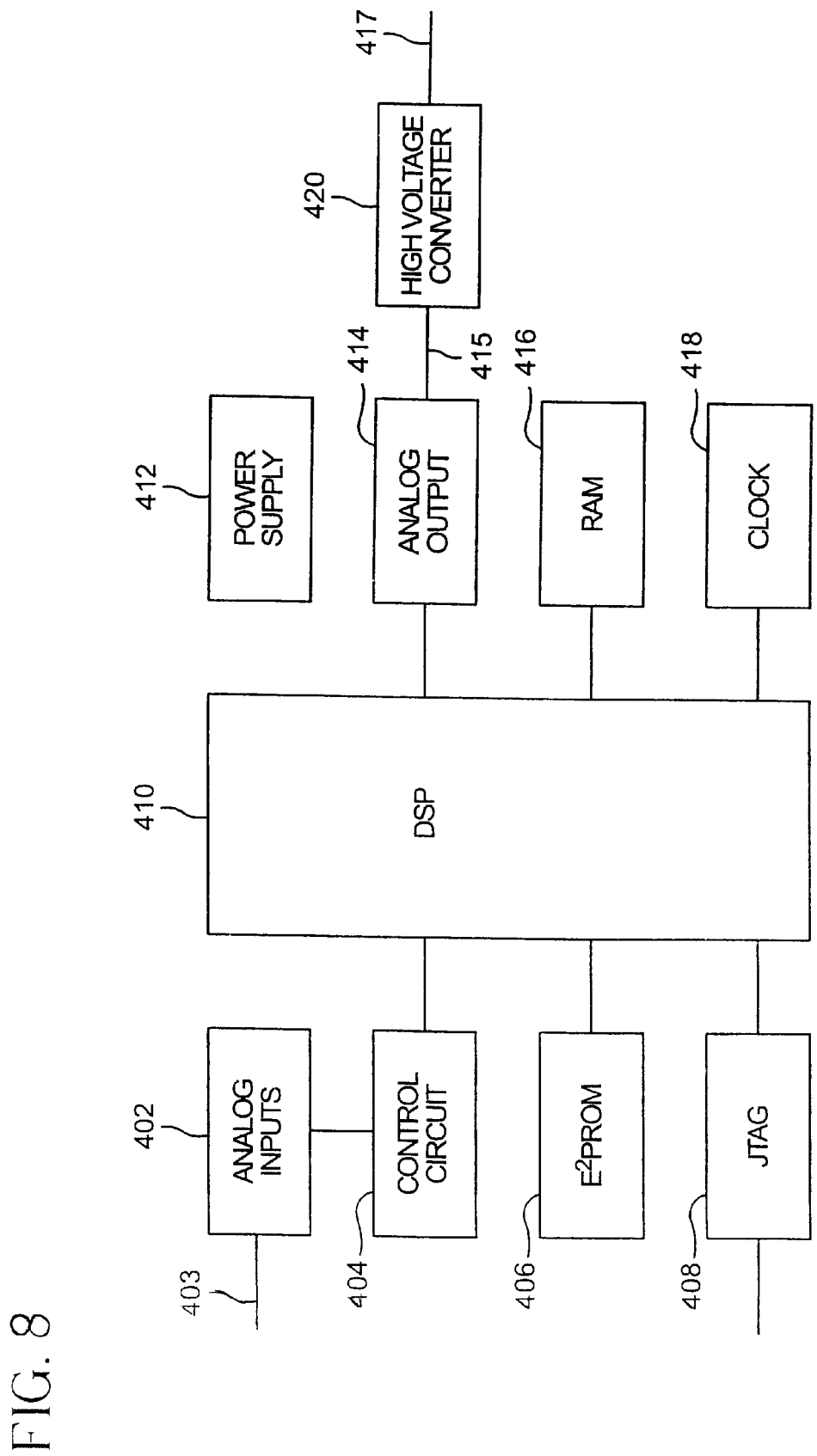
FIG. 8 is a schematic block diagram of a controller circuit of the controller 540 of FIG. 7, in accordance with the present invention.

Referring to FIG. 8, an embodiment of a controller circuit of the controller 540 of FIGS. 1 and 7 is shown for controlling the first and second polarization transformers 44 and 44'. For example, such a controller circuit can be used as the control logic block 540 (FIG. 7). The controller circuit includes analog input section 402, control circuit 404, EEPROM 406, JTAG (Joint Test Action Group) interface 408, digital signal processor (DSP) 410, power supply 412, analog output 414, RAM 416, clock 418 and high voltage converter 420.

The analog input section 402 receives sensor input signals 403 corresponding to monitored parameters such as polarization state, signal spectrum, or temperature. According to the teachings of the present invention, the sensor input signal 403 is simply the instantaneous signal 42 from the photodetector 530. These sensor inputs are conditioned by control circuit 404 and converted to digital signals for input to the DSP 410. Based on a suitable control algorithm programmed into the DSP for the particular polarization transformer 44 and/or 44' embodiment, the sensor inputs are used to determine appropriate analog output signals 415 that are applied to the plate electrodes through high voltage converter 420 (preferably in the range of 200–400V). These output signals 415 provide the appropriate setting for generating one or two modulating signals 552 or 554 of FIG. 1 and FIG. 7.

Operationally and referring back to FIGS. 1 and 7, the second polarization transformer 44' of the sensor circuit 306 of FIG. 7 is illustrated as a basic reference for controlling the main reference of the first transformer 44 in the PMD detector 500 for feedback compensation in the PMD compensator 10 of FIG. 1 to explain better the interelationships seen in FIGS. 1 and 7. Instead of the standard phase-sensitive or 'lock-in' detection, where electronic versions of two optical signals are multiplied (interfered) together to measure the relative phase difference of two optical signals, an optical interference method having certain experimental conveniences, is also possible and is known as homodyning or heterodyning. However, optical heterodyning usually requires two beams, one of which is the reference.

According to the teachings of this invention and referring to FIGS. 1 and 7, only one beam is required which is the optical communications signal (i.e. a stream of pulses) 34. Without the luxury of being able to measure the chromatic dispersion or PMD of a component, where one has the ability to send in an appropriately controlled optical signal as in the heterodyning method, the technique of the present invention is for a single-endpoint monitoring of the PMD impairment in the communications signal 34. Hence, heterodyning can exactly measure chromatic dispersion and PMD, but heterodyning requires access to both ends of a system or device. In the present invention PMD is not explicitly measured, but the impairment due to PMD is measured through the single access to only one end of the system 12 by one beam 34.

The one beam 40 that is tapped from the signal light output 38 which is the output of the incoming beam 34 is naturally polarized (as is all light) but does not go through a first polarizer. The single beam 40 is also composed of two orthogonal polarizations as with all light. Preferably, the light from the single beam 40 should be reasonably monochromatic (i.e. approximately confined to the bandwidth of a single optical transmission channel). If the light 40 is too broadband the degree of polarization (or correlation function) will go to zero, and no meaningful information will be extracted. In other words, only a single optical communications channel should be presented to the detector 500 at a time. Because the beam 40 is tapped from the original signal 34, the light 40 is still a pulsed optical communications signal as with signal 34. If the light 40 was instead continuous (CW), the concept of PMD would lose meaning because there would be no pulses to correlate. Thus some type of pulses are needed in the beam 40 so that a time separation may occur between the two naturally occurring orthogonally polarized pulses 340 and 360.

To obtain optical interference with only one accessible beam 34, the interference is forced between two light signals with orthogonal polarizations which are autocorrelated, cross-correlated or otherwise related from that single beam 34. The polarizer 506 is what is used to interfere the two orthogonal polarizations to obtain the optical interference.

Instead of using a spectroscopic tool, such as a Fourier transform interferometer for spectrally resolving and sensing the spectral information of optical power versus wavelength only (no polarization information is sensed), for spectral analysis of the light passing through the device, the present invention does not spectrally resolve such power versus wavelength information at all. The polarimeter or PMD detector 500 simply measures the correlation function of two orthogonal polarizations.

The use of the cascaded sequence of the first variable retarding waveplate 502, the second variable retarding waveplate 504, and the polarizer 506 becomes a simple polarimeter that detects only the degree-of-polarization (DOP) of the light. It can be proven mathematically that DOP is equivalent to the correlation function. It is already known that the degree-of-polarization is frequently a good measure of the PMD impairment of an optical system. After the polarizer 506 where the two light signals with orthogonal polarizations are interfered, all DOP information in the original light signal (and any state-of-polarization information also) is destroyed, since the polarizer 506 completely linearly polarizes the incoming light. However, the ability to get the cross-correlation of optical pulses of the light wave which is related to the state-of-polarization or degree-of-polarization of the interfered light is still there.

Hence, instead of using a common laser interferometer and counting interference fringes for controlling piezoelectric mechanical actuators used to make small movements on application of a voltage for controlling the phase change of the waveplates of the first polarization transformer 44, a simple inexpensive reference or sensor circuit 306, including the second polarization transformer 44', is used in FIGS. 1 and 7 to control the first polarization transformer 44. The second polarization transformer 44' has nearly identical electro-optic plates 502 and 504 as in the first polarization transformer 44, but in a much simpler and less expensive polarization transformer configuration, than the three or more plates configuration of conventional polarization transformers 44. The first polarization transformer 44 is illustrated by the block 44 having an optical input port for receiving the incoming pulsed optical communication signal 36, an optical output port for coupling the polarization transformed pulsed signal to the differential group delay device 46, and an electrical control port for receiving the PT compensating signal 442 from the controller 540. The input to the reference or sensor circuit 306 is the single accessible light beam 40 tapped by the coupler 37 from the pulsed output signal 38, leaving the differential group delay device 46. The reference or block 306 representing the sensor circuit itself contains electro-optic components comprising, the linear polarizer 506, the second electro-optic phase retarder 504, the first optional retarder 502 if a polarization maintaining optical (PM) tap or PM beamsplitter is not used as the coupler 37, and a photodetector 530. Each of the electro-optic phase retarders has two electrodes separated by a gap, G, and an optical path length, W.

Referring to FIG. 7, both plates or retarders 502 and 504 of the referencing second polarization tranformer 44' preferably have different voltages applied, instead of a periodic signal of FIG. 1, however, for a short time, they could have the same voltage applied. The two polarization transformers 44 and 44' are also in close physical proximity so that they experience similar environmental changes. The first plate or retarder 502 is at an approximately 45° angle to the electric field direction caused by a voltage on the second electro-optic plate 504 processed by the controller 540 based on the amplified voltage V13 received by the photodetector 530. Polarization transformer 44' with the polarizer 506 can be also be thought of as a modulator. If the polarizer 506 is at 90° to the first plate 502, the modulator configuration is normally-off, i.e., with no voltage on the second electro-optic plate 504 (assuming no natural birefringence) no light reaches the photodetector 530. The electric field in the second electro-optic plate 506 is transverse to the direction of beam propagation and the electrodes 102 and 104 are separated by a gap, G. When a voltage is applied to the second electro-optic plate 506, the field-induced birefringence rotates the optical polarization direction so that some of the crossed-correlated or interfered orthogonal polarizations can pass through the polarizer 506 and reach the photodetector 530.

In a single plate polarization transformer 502, the radiation beam 40 travels from left to right (or top to bottom) in the representations of FIGS. 1 and 7 and passes through the plate 502. In general, the polarization state of a radiation beam can be defined by two parameters, θ and φ, where θ defines the relative magnitudes of orthogonal components and φ defines their relative phase. The operation of the single plate 502 is such that input radiation having a constant state of polarization SOP ($\theta_I$ and $\phi_I$) is incident on the plate 502. The output radiation is shown having an output state of polarization SOP ($\theta_o$ and $\phi_o$). With a voltage applied to electrodes 102 and 104 of the plate 502, those components that are polarized along the slow (S) or ordinary and fast (F) or extraordinary axes, are retarded in optical phase by different amounts as they travel through the plate's thickness D. The effects may be visualized as rotating the polarization direction of the beam. When a half-wave voltage Vπ, is applied, the component polarized along the fast axis becomes 180 degree out of phase with the component polarized along the slow axis so that its direction is reversed. Thus, the plate 502 operates to transform a constant input SOP to an output SOP that is tunable over a range of at least 180 degrees.

As a polarization transformer, an ideal material which, with no voltage applied, has equal indices of refraction for all polarization directions (i.e., isotropic). When a voltage is applied, the applied electric field induces a change in index of refraction (also known as field-induced birefiingence) along two principal axes referred to as the fast or ordinary and slow or extradoridinary axes, respectively. The radiation components polarized along the fast and slow axes travel with refractive indices $n_F$ and $n_S$, respectively. The induced birefringence thus causes a relative phase shift in the components. If the plate has a thickness D, the accumulated phase shift or difference is given by $\theta\phi=2\pi(n_F-n_S)D/\lambda$. By adjusting D, Δφ can be made to be π radians=180°. This means that after traversing the plate, the electric field of one polarization component has the opposite sign relative to the other compared to when they entered the plate. For example, if the incoming polarization direction with respect to the optical axis is β, the outgoing direction is then 180°−β for ($n_F-n_S$) positive.

The general requirement for the polarization transformer plate is that, when a voltage is applied, a phase shift is Δφ produced between differing polarization directions. An embodiment of a two plate polarization transformer 44' is illustrated in FIGS. 1 and 7, which show a perspective view of two optical elements 502, 504 with a spacing which can be zero in some cases. A radiation beam travels from left to right in FIG. 7 and first passes through plate 502, acting as the depolarizer, followed by plate 504, acting as a phase modulator. The orientation of the optical axes of the plates 502, 504 is 45 degrees with respect to each other. With the two plate polarization transformer 44', a constant input SOP can be transformed to an arbitrary output SOP.

The arbitrary output SOP now has equal electric field components perpendicular and parallel to the electric field at 45°. With a voltage applied at the second plate 504, those that are parallel are retarded in optical phase as they travel through the plate's thickness W. The effects may be visualized as rotating the polarization direction of the beam. When a half-wave voltage is applied, the component parallel to the beam is 180° out of phase with the perpendicular component so that its direction is reversed. The net result is that the overall beam is polarized at 90° to its original direction and passes through the polarizer 506. The 45° angle is not critical, but deviations require a higher ouput amplifier voltage to produce the same modulation for the controller 540 as the optical data control and optical data correlation (ODC) signal.

It is not necessary for the reference 44' and the first polarization transformer 44 to function identically, as long as they have the same environmental dependence. The major requirement is that the main and reference electro-optic plates must have the same polarization (P), and the same applied electric field. In a sense, the second polarization transformer 44' is trying to match the polarization (P) of the first polarization transmformer 44 which is actually trying to compensate for the polarization (P) impaired by the incoming fiber. The photodetector 530 is inherently a square law device such that the only time-varying signal detected is the ODC interference signal 42 of FIG. 1. Hence, the controller 540 matches the polarization by applying a sinusoidal signal to one of both retarders 502 and/or 504 or actively adjusts the amplitude of one or both retarders 502 and/or 504 based on the amplitude of the time-varying signal ODC interference signal 42 detected by the photodetector 530 of FIG. 1 from the cross-correlated components.

The best match can be obtained by using the same gap between electrodes and electrically connecting the electro-optic plates. A problem may arise, however, if they have the same optical plate thickness, W. The modulation becomes double valued for V>Vπ. Therefore, W for the reference should be adjusted so that Vπ on the main polarization transformer 44 can be reached before the reference 44'. Otherwise, positive feedback will result in the reference 44'.

If the gain of an operational amplifier coupled to an analog input of the controller 540 is large enough, then the voltage applied to the operational amplifier's positive input will cause the output voltage of the operational amplifier to increase until the signal from the photo detector 530 and transimpedance amplifier at the negative input equals the voltage at the positive input in an analog input 402 of FIG. 8. A change in environmental parameters will initially change the voltage at the negative input but the amplifier changes the output voltage to compensate. If the reference polarization transformer 44' and controlled or first polarization transformer 44 are in the same environment, then the compensation will be suitable for both. Since the photo detector voltage at the negative input is independent of hysteresis, the output voltage of the operational amplifier will automatically be adjusted to compensate for that, also. In other words, by measuring an effect that depends on the polarization, the polarization can be compensated.

Hence, the output of a separate reference 44' with a fixed known modulation by the controlled processed variable voltages 552 and 554 is used as feedback to control the transmission of the first polarization transformer 44. A voltage based on the fedback photodetector voltage would be applied to control the main polarization transformer 44 on the assumption that it would respond in the same way.

At least one solid-state electro-optic PLZT phase retarder 504 having electrodes 102 and 104, shown in FIGS. 1 and 7, within both the first and second polarization transformer 44 and 44' provide an electric field across the paths, the electric field in the at least one phase retarder 504 producing relative phase retardation with respect to the two polarization components from the first polarization transformer 44. The polarization recombiner or polarizer 506 combines the polarization components from the at least one retarder 504 of the second polarization transformer 44' to form a modulated optical signal. In FIG. 1, the modulated output optical signal 536 that is optically coupled from the recombiner or polarizer 506 of the second polarization transformer 44' is coupled to the photodetector 530. The photodetector 530 receives at least a portion of the modulated optical signal and provides a feedback signal that controls the first polarization transformer 44 and the second polarization transformer 44'.

According to the teachings of the present invention, the auto-correlation or cross-correlated PMD detector, shown in FIGS. 1 and 7, can be operated in a way similar to a conventional 4-arm polarimeter. Two variable waveplates 502 and 504 are actively adjusted to track the minimum photocurrent reading, to be free of calibration. Hence, the cross-correlated PMD detecting system 500 minimizes the "min/(max+min)" reading and normalizing (min/min+max) the minimum reading from the detector 306. For setting certain phase retardation in a periodic fashion, there is a way to regulate birefringence by measuring the charge flow using a well-known circuit. It does not work for control variables as discharge is not allowed. Here, in the PMD detector application, the ferro-electric retarder plates might find its ideal application. The Stokes parameters can be measured by setting the phase retardation of first waveplate W1 502 and second waveplate W2 504 according to the following table:

| Measurable | W1 | W2 |
|---|---|---|
| $I_x$ | 0 | 0 |
| $I_y$ | 0 | π |
| $I_{45°}$ | π/2 | π/2 |
| $I_{-45°}$ | π/2 | π/2 |
| $I_L$ | 0 | π/2 |
| $I_R$ | 0 | π/2 |

With the six measured intensities, one can calculated the Stokes parameters:

$$P_0 = I_x + I_y$$

$$P_1 = I_x - I_y$$

$$P_2 = I_{45°} - I_{-45°}$$

$$P_3 = I_L - I_R$$

The degree of polarization (DOP) is then:

$$DOP = \frac{\sqrt{P_1^2 + P_2^2 + P_3^2}}{P_0}$$

For use as a feedback signal in a PMDC system, one can simply use $$FEEDBACK = (p_1^2 + P_2^2 + P_3^2)/P_0^2; \text{ or}$$

$$FEEDBACK = P_1^2 + P_2^2 + p_3^2.$$

Figure 9:
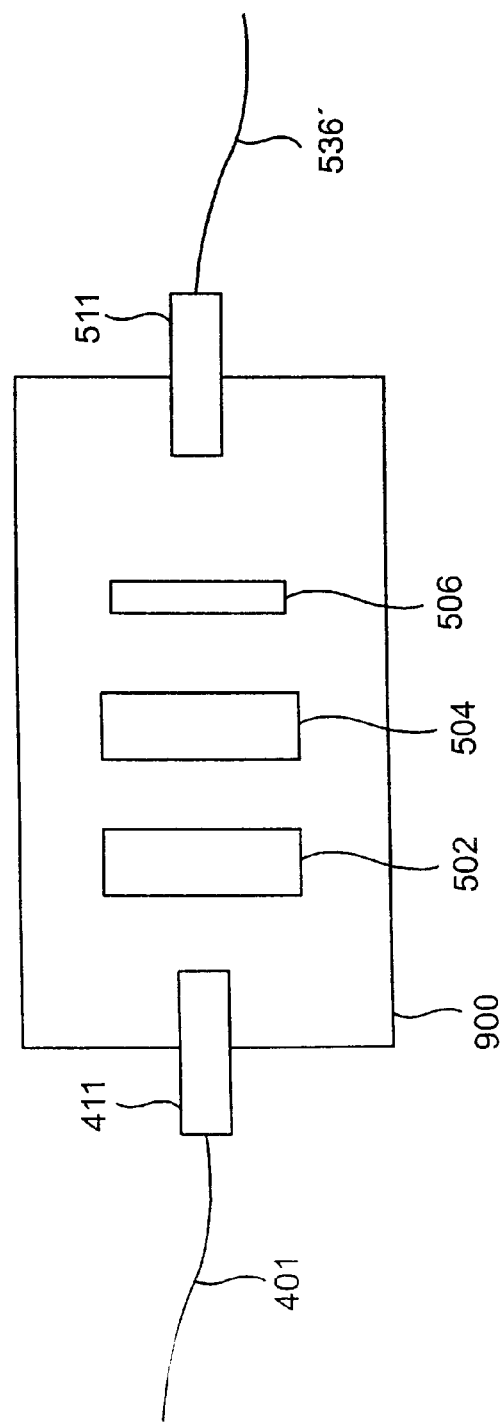
FIG. 9 is part of the cross-correlated PMD detector 306 packaged as a single micro-optic component.

The advantages of using ferro-electric phase retarders as the waveplates 502 and 504 are important to the telecommunications industry. A higher sampling rate can be achieved. Referring to FIG. 9, a simple and reliable package (compared to a 4-arm polarimter) can be obtained. The ferro-electric PMD detector 306 is low cost compared to a 4-arm polarimeter. The ferro-electric PMD detector 306 also has a low tap ratio compared to a 4-arm polarimeter.

In FIGS. 1, 7, and 9, a collimator 511 is used to couple light from the polarizer 530 into a fiber 536 which carries the light to the photodetector 530. Fiber-coupling is more tricky for other more standard DOP measurements using polarimeters, which involve beam-splitting. This cross-correlated method is thus potentially more sensitive because a faster or lower noise photodetector 530 can be used.

Referring to FIG. 9, the cross-correlated PMD detector 306 also lends itself naturally to being implemented as a compact, single micro-optic component enclosed in a housing 900. The first and second variable phase retarders 502 and 504, the polarizer 506 are packaged into a single component with a fiber pigtail input 401 and a fiber pigtail output 536' where the fiber pigtails 401 and 536' are connected to collimating lenses 411 and 511, respectively, contained within the single component enclosed by the housing 900.

The collimator 511 is preferred to provide efficient coupling into the fiber 536' of the power in the free-space beam propagating through the variable phase plates 502 and 504 and the polarizer 506. On the other end, there is also an input collimator 411 with the job of coupling power efficiently from the input fiber 401 into the free-space beam which propagates along the optical axis of the variable phase retarders 502 and 504 and the polarizer 506.

Analogously, the first and second variable phase retarders 502 and 504, the polarizer 506, and the photodetector 530 are packaged into a single micro-optic component with a fiber pigtail input 401 and an electrical output, the fiber pigtail input 401 being connected to a collimating lens 411 contained within the single component. The fiber pigtail output 536' is a standard less costly fiber and does not have to be a polarization-maintaining fiber.

Hence, not having to use a beam-splitter, a lot of flexible placement is possible for the cross-correlated PMD detector 306. For example, the placement of the photodetector 530 is flexible enough for the photodetector 530 to be physically placed immediately adjacent to the polarizer 506, without the collimator 511 in FIG. 1. Alternatively, if the photodetector 530 is remote from the polarizer 506, of claim 1, a collimator 511 and a fiber 536' can couple the light from the polarizer 506 to the photodetector 530. The fiber 536 does not even have to be a polarization-maintaining fiber, a standard fiber will do.

It is to be appreciated that the 45 degree orientation between the two variable phase plates 502 and 504 might be achieved with an intervening fixed waveplate, so that physical orientation of the two plates could be even less constrained. Hence, the 45 degree orientation of the second variable phase retarder 504 with respect to the first variable phase retarder 502 of claim 1 is achieved by any combination of relative physical rotation of the second variable phase retarder 504 with respect to the first retarder 502 and rotation of the polarization reference frame between the two variable phase retarders 502 and 504 by a fixed phase retarding plate (not shown but included as part of the present invention). There are various approaches to relaxing the requirements on the physical orientation of the variable plates 502 and 504. The polarization eigenstates can can only be compared (e.g. for relative orientation angle) at the same place in space—in other words, one pair of states has to be transported to the other pair of states through any intervening structure and properly transformed by that structure before comparison. Hence, any intervening structure, such as a waveplate at 22.5 degrees could be used with the present invention.

It will be apparent to those skilled in the art that various other modifications, such as magneto-optic waveplates, instead of photo-elastic waveplates, and other variations can be made to the present invention without departing from the spirit and scope of the invention. Thus, it is intended that the present invention cover the modifications and variations of this invention provided they come within the scope of the appended claims and their equivalents.

What is claimed is:

1. A polarization mode dispersion (PMD) detector for measuring PMD impairment through the cross-correlation of optical pulses of a light wave for controlling one or more polarization transformers and a plurality of differential group delay elements in a PMD compensator, the detector comprising:

a first variable phase retarder having a first controllable phase retardation exerted between a pair of orthogonal polarization components of the light wave in a fast axis and a slow axis of the first variable phase retarder;

a second variable phase retarder oriented at a 45-degree angle with respect to the first variable phase retarder such that the second variable phase retarder has polarization eigenstates oriented at a 45-degree angle with respect to the polarization eigenstates of the first variable phase retarder, the second variable phase retarder having a second controllable phase retardation exerted between a pair of orthogonal polarization components of the light wave in a fast axis and a slow axis of the second variable phase retarder, wherein the first and second variable phase retarders each comprises a solid-state ferroelectric variable waveplate having electrode pairs for the application of applied voltages that facilitate the application of variable electric fields perpendicular to the light propagation direction, the electric field in each of the waveplate defining the direction of the slow axis in each of the waveplate and causing the first phase retardation and the second phase retardation that are independently controlled through the applied voltages across the electrode pairs;

a linear polarizer optically coupled to the second variable phase retarder, the polarizer having a polarization direction parallel to the first variable phase retarder;

a low-speed photodetector optically coupled with the polarizer for sensing the intensity of the light wave transmitted through the linear polarizer as a measure of PMD impairment through the cross-correlation of optical pulses of the light wave; and a controller for varying the first controllable phase retardation of the first variable phase retarder and for varying the second controllable phase retardation of the second variable phase retarder to minimize the measure of PMD impairment and for controlling the at least one polarization transformer and the plurality of differential group delay elements, in response to the measure of PMD impairment.

2. The detector of claim 1 wherein the second controllable phase retardation is varied in a periodic fashion with a magnitude of at least $2\pi$ while the first controllable phase retardation is adjusted by the controller so that the oscillation of the light intensity sensed by the photodetector reaches a maximum that serves as a measure of the cross-correlation of the light pulses.

3. The detector of claim 1 wherein both the first controllable phase retardation and the second controllable phase retardation are varied independently by the controller such that the light intensity sensed by the low-speed photodetector reaches a minimum as an indication of the cross-correlation of the optical pulses of the light wave for representing the measure of PMD impairment.

4. The detector of claim 1 wherein the first variable phase retarder and the second variable phase retarder each comprises a material in the lead lanthanum zirconate titanate (PLZT) system.

5. The detector of claim 1 further comprising a collimator coupled between the linear polarizer and the low-speed photodetector.

6. The detector of claim 1 wherein the first and second variable retarders comprise a first ferroelectric complex oxide waveplate and a second ferroelectric complex oxide waveplate.

7. A polarization compensator for compensation of polarization mode dispersion (PMD)-induced distortion of a light wave in transmission fibers of an optical transmission system, the compensator comprising:
   a plurality of differential group delay elements for adjusting PMD values;
   at least one polarization transformer for coupling the light wave to the plurality of differential group delay elements to provide endless compensation of the PMD-induced signal distortion such that the at least one polarization transformer has sufficient degrees of freedom, image-forming the two PSPs of the fiber being compensated onto the PSPs of the plurality of differential group delay elements, without settling at a local minimum of the overall PMD;
   a polarization mode dispersion detector for measuring PMD-induced impairment through the cross-correlation of optical pulses of the light wave, the detector comprising:
      a first variable phase retarder having a first controllable phase retardation exerted between a pair of orthogonal polarization components of the light wave in a fast axis and a slow axis of the first variable phase retarder;
      a second variable phase retarder oriented at a 45-degree angle with respect to the first variable phase retarder, the second variable phase retarder having a second controllable phase retardation exerted between a pair of orthogonal polarization components of the light wave in a fast axis and a slow axis of the second variable phase retarder
         wherein the first and second variable phase retarders each comprises a solid-state ferroelectric variable waveplate having electrode pairs for the application of applied voltages that facilitate the application of variable electric fields perpendicular to the light propagation direction, the electric field in each of the waveplate defining the direction of the slow axis in each of the waveplate and causing the first phase retardation and the second phase retardation that are independently controlled through the applied voltages across the electrode pairs;
      a linear polarizer optically coupled to the second variable phase retarder, the linear polarizer having a polarization direction parallel to the first variable phase retarder;
      a low-speed photodetector optically coupled with the polarizer for sensing the intensity of the light transmitted through the linear polarizer; and
      a controller for varying the first controllable phase retardation of the first variable phase retarder and for varying the second controllable phase retardation of the second variable phase retarder to minimize the measure of PMD impairment and for controlling the at least one polarization transformer and the plurality of differential group delay elements, in response to the measure of PMD impairment such that the endless compensation of the PMD-induced signal distortion results.

8. The compensator of claim 7, wherein the second controllable phase retardation is varied in a periodic fashion with a magnitude of at least $2\pi$ while the first controllable phase retardation is adjusted by the controller so that the oscillation of the light intensity sensed by the photodetector reaches a maximum that serves as a measure of the cross-correlation of the light pulses.

9. The compensator of claim 7, wherein both the first controllable phase retardation and the second controllable phase retardation are varied independently by the controller such that the light intensity sensed by the low-speed photodetector reaches a minimum as an indication of the cross-correlation of the optical pulses of the light wave for representing the measure of PMD impairment.

10. The compensator of claim 7 wherein the first variable phase retarder comprises a PLZT variable waveplate.

11. The compensator of claim 10 wherein the second variable phase retarder comprises a PLZT waveplate.

12. The compensator of claim 7 wherein the first variable phase retarder comprises a PMN-PT waveplate.

13. The compensator of claim 12 wherein the second variable phase retarder comprises a PMN-PT waveplate.

14. The compensator of claim 7, wherein the first variable phase retarder comprises a PZN-PT waveplate.

15. The compensator of claim 14, wherein the second variable phase retarder comprises a PZN-PT waveplate.

16. A method for detecting polarization mode dispersion (PMD) impairment, the method comprising the steps of:
   providing first and second variable phase retarders each comprising a solid-state ferroelectric variable wavep late having electrode pairs for the application of applied voltages that facilitate the application of variable electric fields perpendicular to the light propagation direction, the electric field in each of the waveplate defining the direction of the slow axis in each of the waveplate and causing the first phase retardation and the second phase retardation that are independently controlled through the applied voltages across the electrode pairs;
   varying a first controllable phase retardation exerted between a first pair of orthogonal polarization components of the light wave in a fast axis and a slow axis of a the first variable phase retarder;
   orienting the second variable phase retarder at a 45-degree angle with respect to the first variable phase retarder;
   varying a second controllable phase retardation exerted between a second pair of orthogonal polarization components of the light wave in a fast axis and a slow axis of the second variable phase retarder;
   linear polarizing the first and second pairs of orthogonal polarization components of the light wave that are aligned at a 45-degree angle with each other in a polarized direction parallel to the first pair for cross-correlating the optical pulses of the light wave;
   sensing the intensity of the cross-correlation as a measure of PMD impairment; and
   controlling the first controllable phase retardation of the first and second variable phase retarders to minimize the measure of PMD impairment and for controlling at least one polarization transformer and a plurality of differential group delay elements, in response to the measure of PMD impairment.

17. The method of claim 16, wherein the controlling step comprises varying the second controllable phase retardation in a periodic fashion with a magnitude of at least $2\pi$ while the first controllable phase retardation is adjusted by a controller so that the oscillation of the light intensity sensed by a photodetector reaches a maximum that serves as a measure of the cross-correlation of the light pulses.

18. The method of claim 16, wherein the controlling steps comprises independently varying both the first controllable phase retardation and the second controllable phase retardation by a controller such that the light intensity sensed by a low-speed photodetector reaches a minimum as an indication of the cross-correlation of the optical pulses of the light wave for representing the measure of PMD impairment.

* * * * *